(12) United States Patent
Hodel et al.

(10) Patent No.: US 11,477,937 B2
(45) Date of Patent: Oct. 25, 2022

(54) SYSTEMS, METHODS, AND APPARATUS FOR AGRICULTURAL MATERIAL APPLICATION

(71) Applicant: PRECISION PLANTING LLC, Tremont, IL (US)

(72) Inventors: Jeremy Hodel, Morton, IL (US); Doug Urbaniak, Mackinaw, IL (US)

(73) Assignee: Precision Planting LLC, Tremont, IL (US)

( * ) Notice: Subject to any disclaimer, the term of this patent is extended or adjusted under 35 U.S.C. 154(b) by 721 days.

(21) Appl. No.: 16/333,542

(22) PCT Filed: Sep. 15, 2017

(86) PCT No.: PCT/US2017/051792
§ 371 (c)(1),
(2) Date: Mar. 14, 2019

(87) PCT Pub. No.: WO2018/053274
PCT Pub. Date: Mar. 22, 2018

(65) Prior Publication Data
US 2019/0254226 A1   Aug. 22, 2019

Related U.S. Application Data

(60) Provisional application No. 62/526,201, filed on Jun. 28, 2017, provisional application No. 62/447,810, (Continued)

(51) Int. Cl.
*A01C 23/02* (2006.01)
*A01C 5/06* (2006.01)
(Continued)

(52) U.S. Cl.
CPC ............ *A01C 23/025* (2013.01); *A01C 5/062* (2013.01); *A01C 5/064* (2013.01); *A01C 5/068* (2013.01); *A01C 7/06* (2013.01); *A01C 7/203* (2013.01)

(58) Field of Classification Search
CPC ........... A01C 5/062; A01C 5/064; A01C 7/06; A01C 7/203
See application file for complete search history.

(56) References Cited

U.S. PATENT DOCUMENTS 1,229,194 A * 6/1917 Patric ...................... A01C 7/06
111/186
2,988,025 A 6/1961 Johnston
(Continued)

FOREIGN PATENT DOCUMENTS

CN 201398297 2/2010
CN 101874436 11/2010
(Continued)

OTHER PUBLICATIONS

"Single-Disk Fertilizer Openers", MaxEmerge Plus Drawn Conservation 12-Row Wide and 16-Row Narrow Flex Fold Planters, Aug. 17, 16, 3 pages.
(Continued)

*Primary Examiner* — Alicia Torres

(57) ABSTRACT

An agricultural row unit includes a knife disposed ahead of the gauge wheel for delivering material to soil adjacent to a trench. In one example, an agricultural toolbar includes a frame, a wheel mounted to the frame, and a knife disposed ahead of the wheel and comprising a material delivery conduit disposed on, through, or adjacent the knife.

25 Claims, 47 Drawing Sheets

Related U.S. Application Data filed on Jan. 18, 2017, provisional application No. 62/436,935, filed on Dec. 20, 2016, provisional application No. 62/423,724, filed on Nov. 17, 2016, provisional application No. 62/395,840, filed on Sep. 16, 2016.

(51) Int. Cl.
*A01C 7/06* (2006.01)
*A01C 7/20* (2006.01)

(56) References Cited

U.S. PATENT DOCUMENTS

| | | | |
|---|---|---|---|
| 3,177,830 A * | 4/1965 | Zimmerman | A01C 5/06 |
| | | | 111/194 |
| 3,319,590 A | 5/1967 | Zimmerman | |
| 3,507,233 A * | 4/1970 | Greig | A01C 5/064 |
| | | | 111/194 |
| 3,623,439 A * | 11/1971 | Hair, Jr | A01C 5/062 |
| | | | 111/149 |
| 4,762,075 A | 8/1988 | Halford | |
| 4,768,449 A | 9/1988 | Kaneko et al. | |
| 5,351,635 A | 10/1994 | Hulicsko | |
| 5,520,125 A | 5/1996 | Thompson | |
| 5,970,891 A | 10/1999 | Schlagel | |
| 6,024,179 A | 2/2000 | Bourgault | |
| 6,067,918 A | 5/2000 | Kirby | |
| 6,345,671 B1 | 2/2002 | Correa et al. | |
| 6,688,243 B1 * | 2/2004 | Buchholtz | A01B 49/06 |
| | | | 111/139 |
| 7,004,090 B2 | 2/2006 | Swanson | |
| 7,152,539 B2 | 12/2006 | Swanson | |
| 7,213,523 B2 | 5/2007 | Neudorf et al. | |
| 7,481,171 B2 | 1/2009 | Martin | |
| 7,490,564 B2 | 2/2009 | Allan et al. | |
| 7,568,439 B2 | 8/2009 | Steinlage et al. | |
| 7,581,503 B2 | 9/2009 | Martin et al. | |
| 7,584,706 B1 | 9/2009 | Smith | |
| 7,712,423 B2 | 5/2010 | Allan et al. | |
| 7,870,827 B2 | 1/2011 | Bassett | |
| 8,327,780 B2 | 12/2012 | Bassett | |
| 8,359,988 B2 | 1/2013 | Bassett | |
| 8,776,701 B2 | 7/2014 | Nikkel et al. | |
| 9,032,885 B2 | 5/2015 | Cruson et al. | |
| 9,326,438 B2 | 5/2016 | Schaffert et al. | |
| 9,635,805 B2 | 5/2017 | Wiesenburger | |
| 9,642,301 B2 | 5/2017 | Wiesenburger | |
| 2002/0195033 A1 | 12/2002 | Schaffert | |
| 2008/0257238 A1 | 10/2008 | Friesen | |
| 2008/0314301 A1 * | 12/2008 | Whalen | A01C 23/025 |
| | | | 111/121 |
| 2010/0107941 A1 | 5/2010 | Schilling et al. | |
| 2011/0232552 A1 | 9/2011 | Schilling et al. | |
| 2012/0210920 A1 | 8/2012 | Bassett | |
| 2012/0234218 A1 | 9/2012 | Martin | |
| 2012/0240835 A1 | 9/2012 | Schilling et al. | |
| 2014/0090585 A1 | 4/2014 | Sauder et al. | |
| 2014/0158031 A1 * | 6/2014 | Hagny | A01C 5/064 |
| | | | 111/121 |
| 2015/0144039 A1 | 5/2015 | Benko et al. | |
| 2016/0088789 A1 | 3/2016 | Anderson et al. | |
| 2016/0113187 A1 | 4/2016 | Hesla | |

FOREIGN PATENT DOCUMENTS

| | | |
|---|---|---|
| CN | 103125179 | 6/2013 |
| DE | 10 2008 027064 A1 | 12/2009 |
| EP | 117745 A1 | 9/1984 |
| EP | 2 789 477 A1 | 10/2014 |
| RU | 2419276 C1 | 5/2011 |

OTHER PUBLICATIONS

Martin Industries Statement, 1 page, created Apr. 13, 1999.
European Patent Office, Search Report for related European Application No. EP17851609.2, dated Apr. 14, 2020.
PCT International Search Report and Written Opinion for PCT/US2017/051792, 17 pages, dated Nov. 16, 2017.
Department of the Ukrainian Patent Office, Official Action for related Ukrainian Application No. UA 2019 03833, dated Oct. 29, 2020 and English Translation provided by Gorodissky & Partners Law firm Ltd.
Russian Federal Institute of Industrial Property, Examination and Search Report for related Russian Application No. 2019111136, dated Nov. 2, 2020.

\* cited by examiner

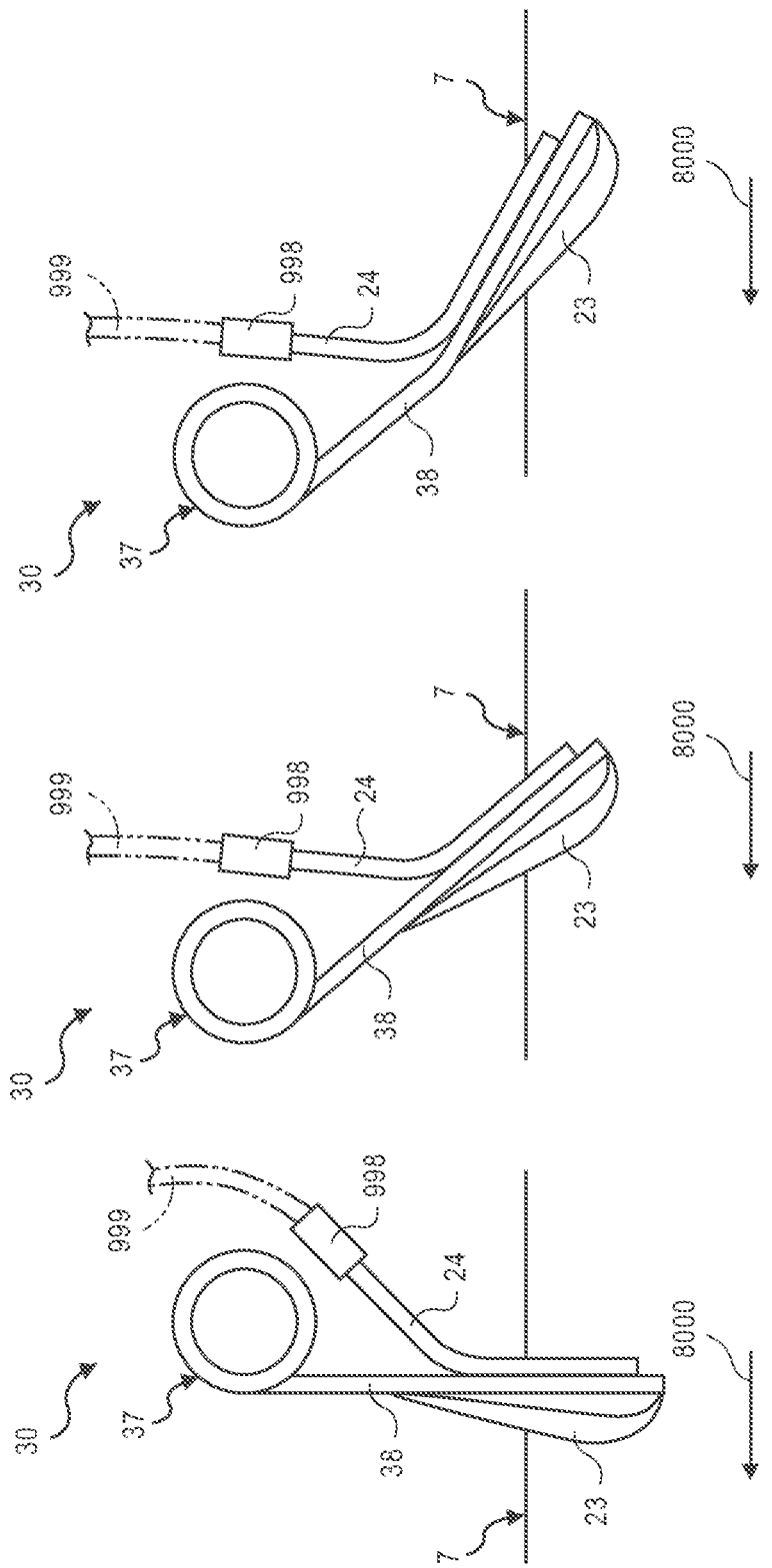

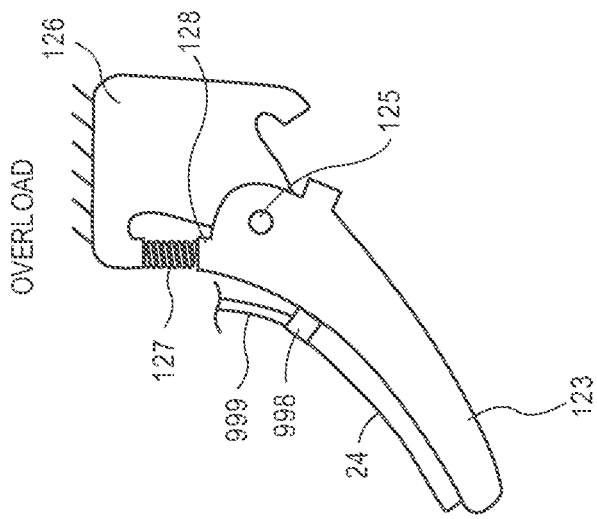
FIG. 18C
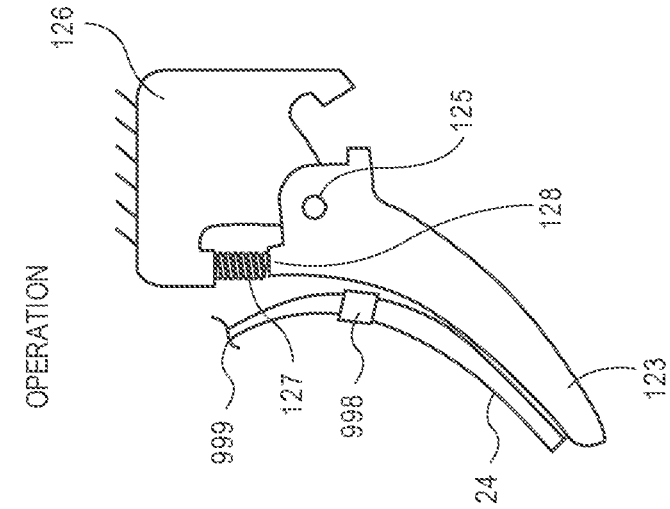
FIG. 18B
FIG. 18A

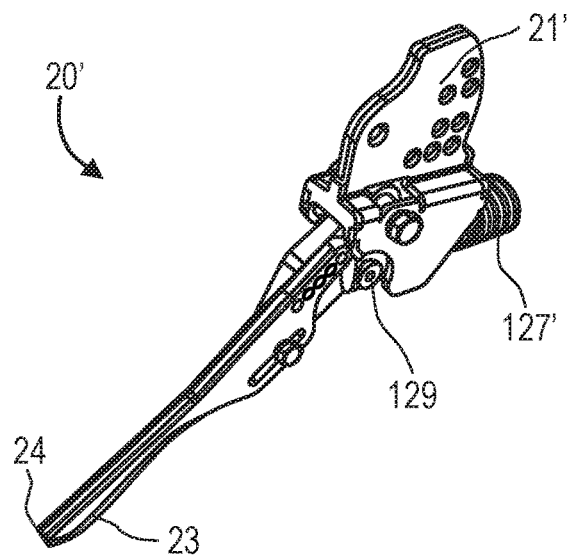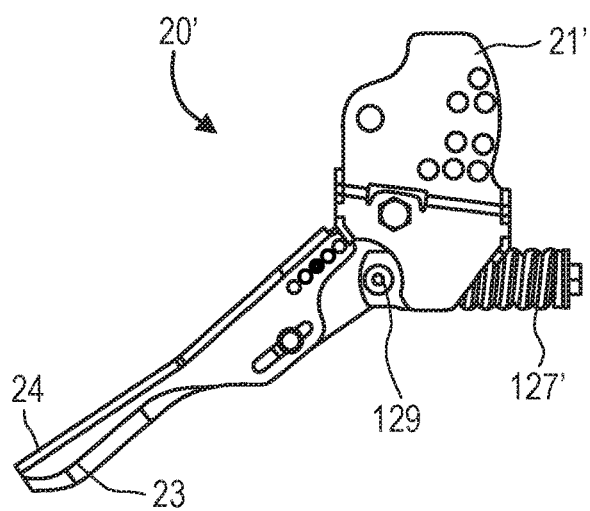
FIG. 21A  FIG. 21B
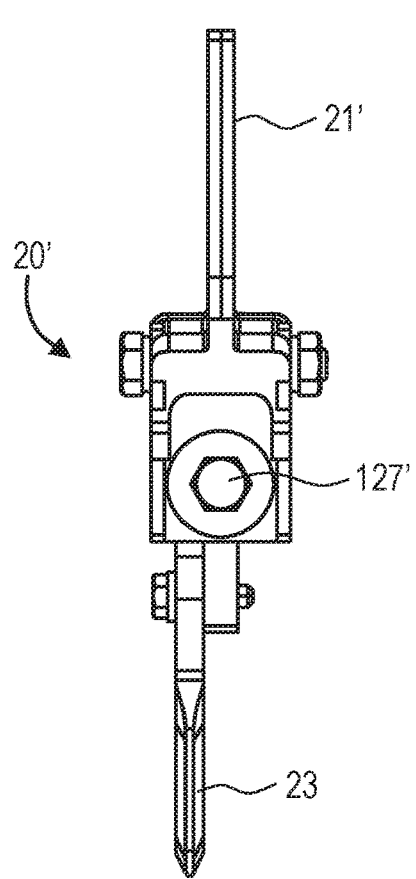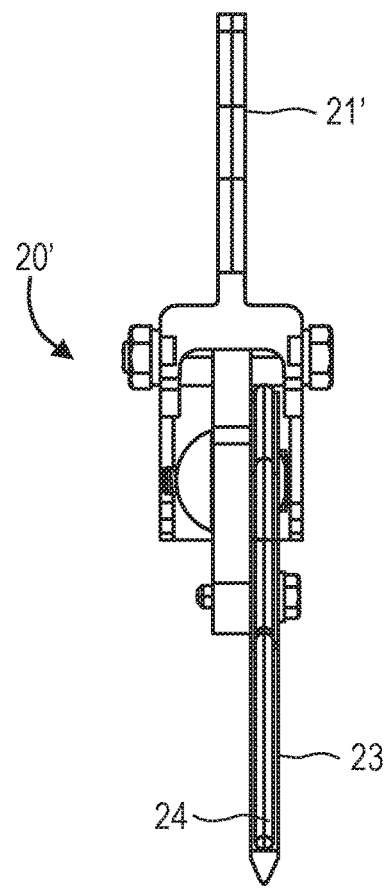
FIG. 21C  FIG. 21D

SYSTEMS, METHODS, AND APPARATUS FOR AGRICULTURAL MATERIAL APPLICATION

RELATED APPLICATIONS

This application claims priority under 35 U.S.C. § 371 to International Application No. PCT/US17/51792 filed Sep. 15, 2017, entitled SYSTEMS, METHODS, AND APPARATUS FOR AGRICULTURAL MATERIAL APPLICATION which claims the benefit to U.S. Provisional Application No. 62/395,840 filed on 16 Sep. 2016; U.S. Provisional Application No. 62/423,724 filed on 17 Nov. 2016; U.S. Provisional Application No. 62/436,935 filed on 20 Dec. 2016; U.S. Provisional Application No. 62/447,810 filed on 18 Jan. 2017; and U.S. Provisional Application No. 62/526,201 filed on 28 Jun. 2017, all entitled: SYSTEMS, METHODS, AND APPARATUS FOR AGRICULTURAL MATERIAL APPLICATION the entire contents of which are hereby incorporated by reference.

TECHNICAL FIELD

Embodiments of the present disclosure relate to implements and application units for material placement adjacent a trench.

BACKGROUND

Adding materials (such as fertilizers) adjacent to seed trenches during planting is a good way to deliver the materials to the soil for growing plants to access the material during a later growing stage. This eliminates a pass over the field to reduce compaction of the soil from separate planting and material application passes. Not all of the fertilizer that a growing plant needs can be delivered in the seed trench without damaging the seed. Some of the fertilizer is placed adjacent to the seed trench, and when the plant grows and extends into the zone where the fertilizer was placed, the plant can then use the fertilizer.

There are several implements that deliver fertilizer to soil adjacent to the trench on a planter row unit. These use implements that generally use coulters or knives to open a space adjacent the trench and include a liquid delivery tube for delivering fertilizer. These implements are located in one of three places. They are usually installed after the closing wheels on the row planter, or they can be installed between the closing wheels and the furrow discs. The drawback to these locations is that the overall length of each individual row unit is longer, and when folded for transport, the planter is wider, which makes it difficult to travel over roads. When the row unit is longer, it becomes harder to make turns. Also, fertilizer can then cross over previously planted furrows and deliver fertilizer where it is not intended. Additionally, rear mounted attachments are less consistent with vertical placement of liquid products because the depth of the attachment varies when topography is encountered. They can also be installed ahead of the row unit. This makes it difficult to install because additional framework is needed to attach to the row unit, which increases costs. These can also cause excessive disturbance to the soil near the seed furrow and can compromise precise placement of seeds and uniform emergence of seed. There is also lack of depth consistency because of topography, and there is an inability to apply banded fertilizer product to each side of the seed furrow. Also, these implements can accumulate crop residue, which reduces their performance.

BRIEF DESCRIPTION OF THE DRAWINGS

The present disclosure is illustrated by way of example, and not by way of limitation, in the figures of the accompanying drawings and in which:

FIG. 8C is a side elevation view of the adjacent trench liquid delivery system of FIG. 8A according to one embodiment.

FIG. 8D is a side elevation view of the adjacent trench liquid delivery system of FIG. 8A disposed at a rearward angle away from a direction of travel according to one embodiment.

FIG. 8E is a side elevation view of another embodiment of the adjacent trench liquid delivery system having a doglegged downwardly extending element according to one embodiment.

FIGS. 18A to 18C are side elevation views of a knife pivotably mounted to a knife bracket according to one embodiment.

FIG. 21A is a perspective view of the knife assembly from FIGS. 19A to 20C according to one embodiment.

FIG. 21B is a right elevation view of the knife assembly of FIG. 21A according to one embodiment.

FIG. 21C is a back elevation view of the knife assembly of FIG. 21A according to one embodiment.

FIG. 21D is a front elevation view of the knife assembly of FIG. 21A according to one embodiment.

BRIEF SUMMARY

Figure 1:
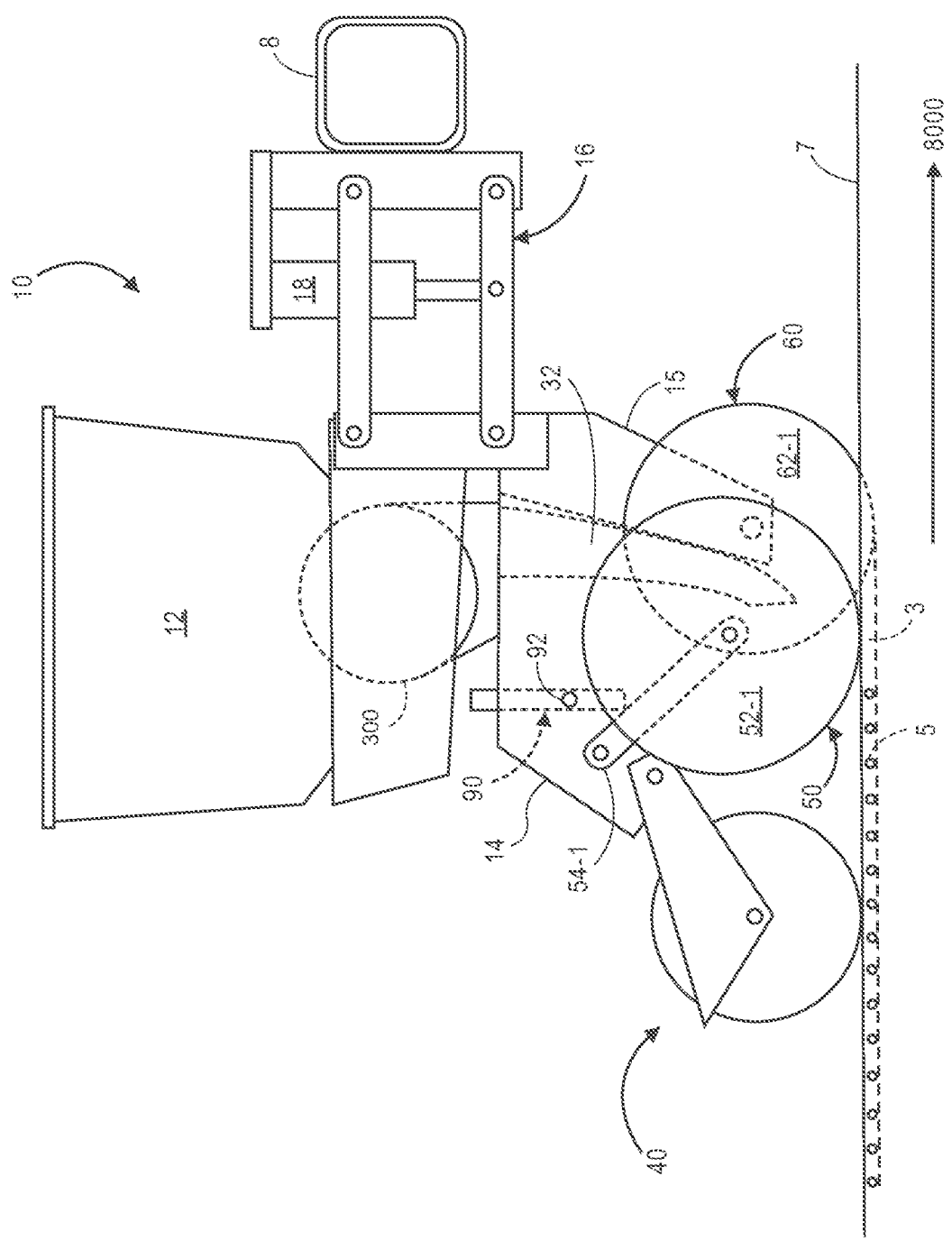
FIG. 1 shows a typical row unit.

Described herein is an agricultural row unit 10 (e.g., agricultural toolbar 10) for planting seeds in a trench 3 that includes a knife 23 having a material delivery conduit 24 disposed on, in or adjacent the knife 23 for delivering materials to soil adjacent the trench 3 according to one embodiment. Knife 23 is disposed ahead of gauge wheel 52 on row unit 10.

DETAILED DESCRIPTION

All references cited herein are hereby incorporated by reference in their entireties. In the event of a conflict in a definition in the present disclosure and that of a cited reference, the present disclosure controls.

Figure 2:
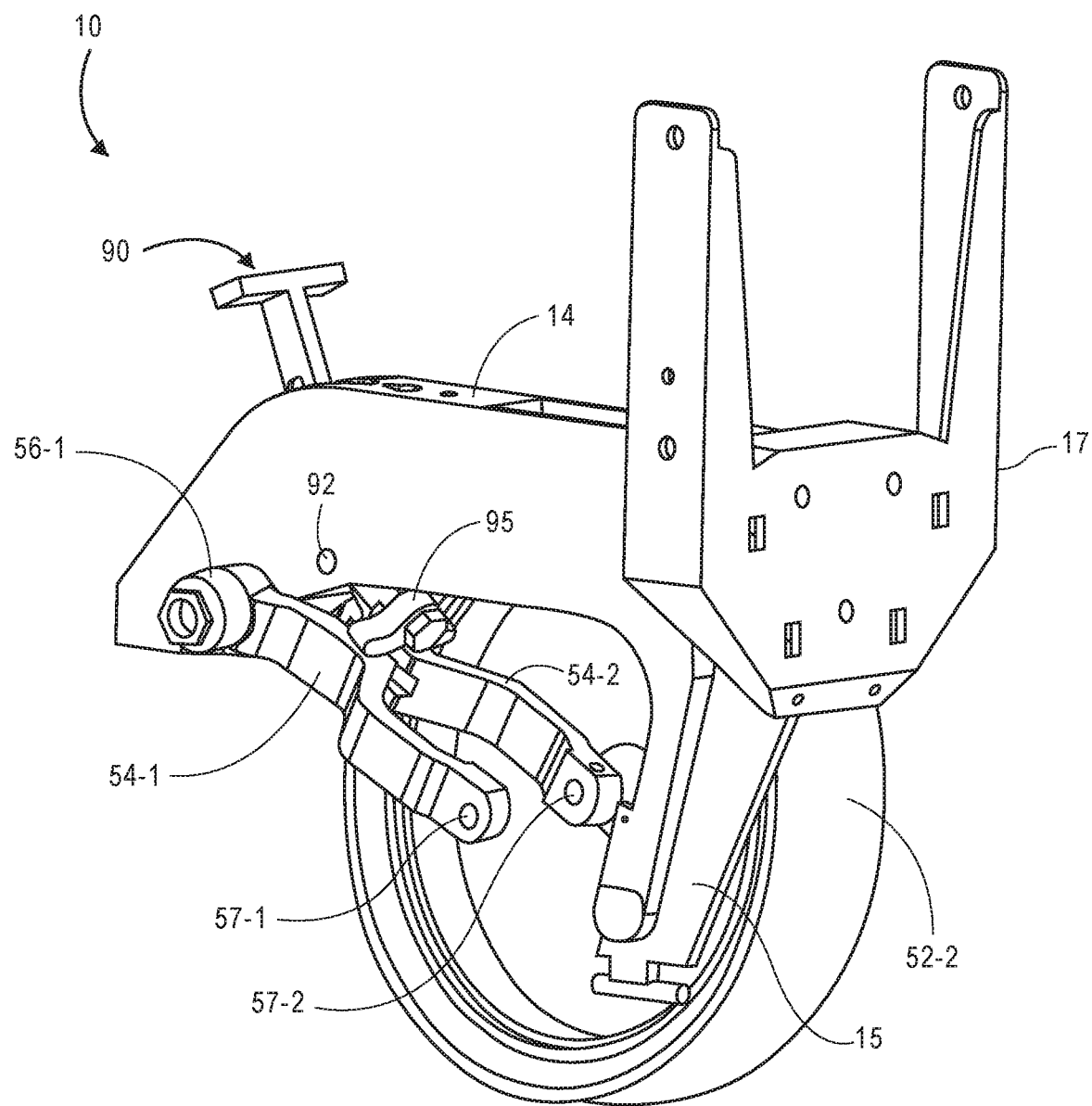
FIG. 2 is a perspective view of row unit with gauge wheel and opening disc assembly removed.

Referring now to the drawings, wherein like reference numerals designate identical or corresponding parts throughout the several views, FIGS. 1 and 2 illustrate a single row unit 10 of a conventional row crop planter. As is well known in the art, the row units 10 are mounted in spaced relation along the length of a transverse toolbar 8 by a parallel linkage 16 which permits each row unit 10 to move vertically independently of the toolbar and the other spaced row units in order to accommodate changes in terrain or upon the row unit encountering a rock or other obstruction as the planter is drawn through the field. Each row unit 10 includes a frame 14 which operably supports a seed hopper 12, a furrow opening assembly 60, a seed meter 300, a seed tube 32 and a furrow closing assembly 40. Frame 14 is connected to parallel linkage 16 by shank bracket 17. Optionally, an actuator 18 can vary a force applied to parallel linkage 16.

Figure 27:
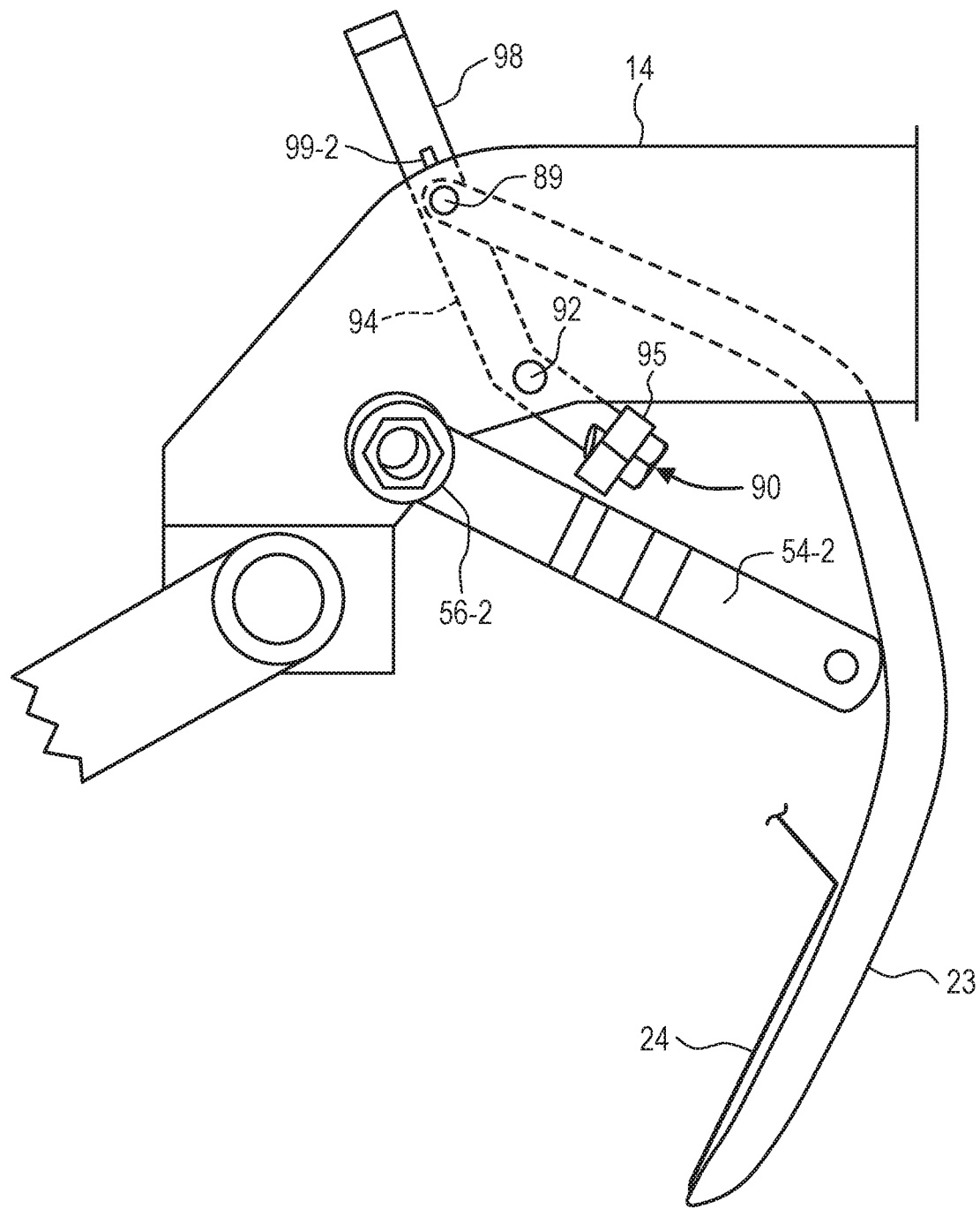
FIG. 27 is a side elevation view of a fluid injector connected to a depth adjustment according to one embodiment.

A depth adjustment assembly 90 is illustrated in FIG. 27. The depth adjustment assembly 90 includes a rocker 95 pivotally mounted to a depth adjustment body 94. The depth adjustment body 94 is pivotally mounted to the row unit frame 14 about the pivot 92. A handle 98 is preferably slidably received within the depth adjustment body 94 such that the user can selectively engage and disengage the handle (e.g., left and right hooks 99-1, 99-2, respectively, which may be formed as a part of the handle 98) with one of a plurality of depth adjustment slots 97 (not shown) formed within the row unit frame 14.

The opening disc assembly 60 includes two angled opening discs 62-1, 62-2 rollingly mounted to a downwardly extending shank 15 of the frame 14 and disposed to open a v-shaped trench 3 (i.e., furrow, seed furrow) in a soil surface 7 as the row unit traverses a field in direction 8000. The row unit 10 includes a gauge wheel assembly 50 including two gauge wheels 52-1, 52-2 pivotally mounted to either side of the frame 14 by two gauge wheel arms 54-1, 54-2 and disposed to roll along the surface of the soil. Gauge wheel arm 54 (54-1, 54-2) is connected to frame 14 through a connector 56 (56-1, 56-2). A depth adjustment assembly 90 pivotally mounted to the frame 14 at a pivot 92 preferably contacts the gauge wheel arms 54-1, 54-2 to limit the upward travel of the gauge wheel arms 54-1, 54-2, thus limiting the depth of the trench opened by the opening disc assembly 60. A closing assembly 40 can be included and is pivotally coupled to the frame 14 and configured to move soil back into the trench 3.

Figure 3:
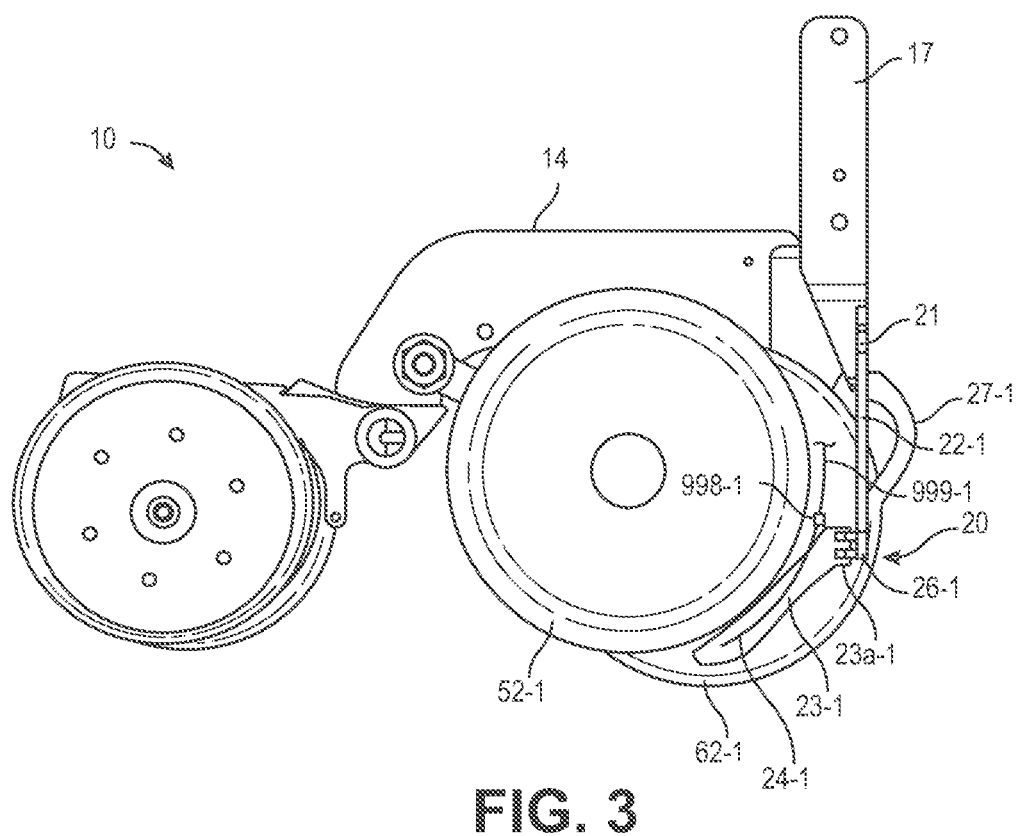
FIG. 3 is a side elevation view of a row unit showing the knife assembly according to one embodiment.
Figure 4:
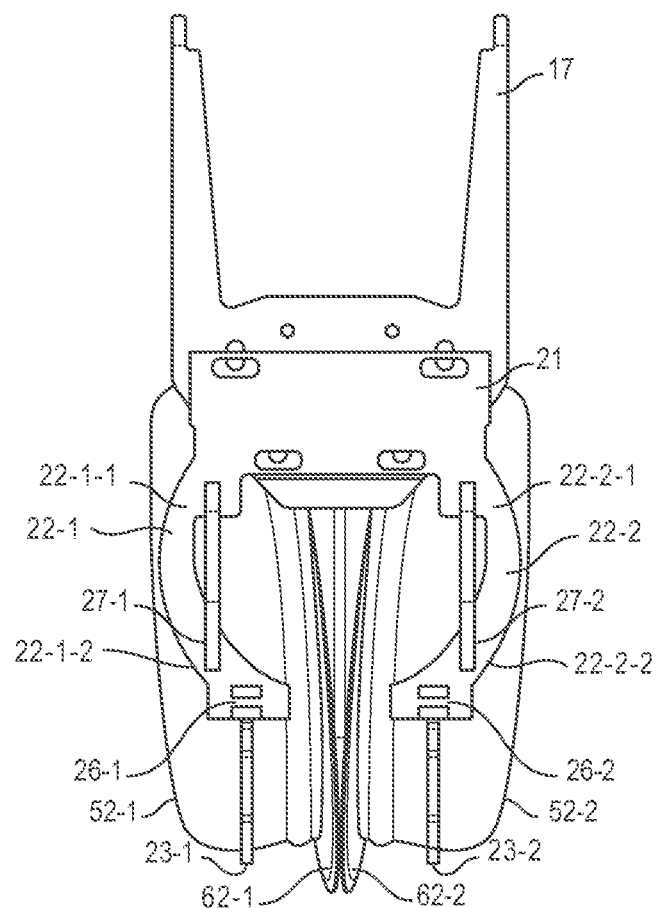
FIG. 4 is an end view of a row unit showing the knife assembly according to one embodiment.
Figure 5:
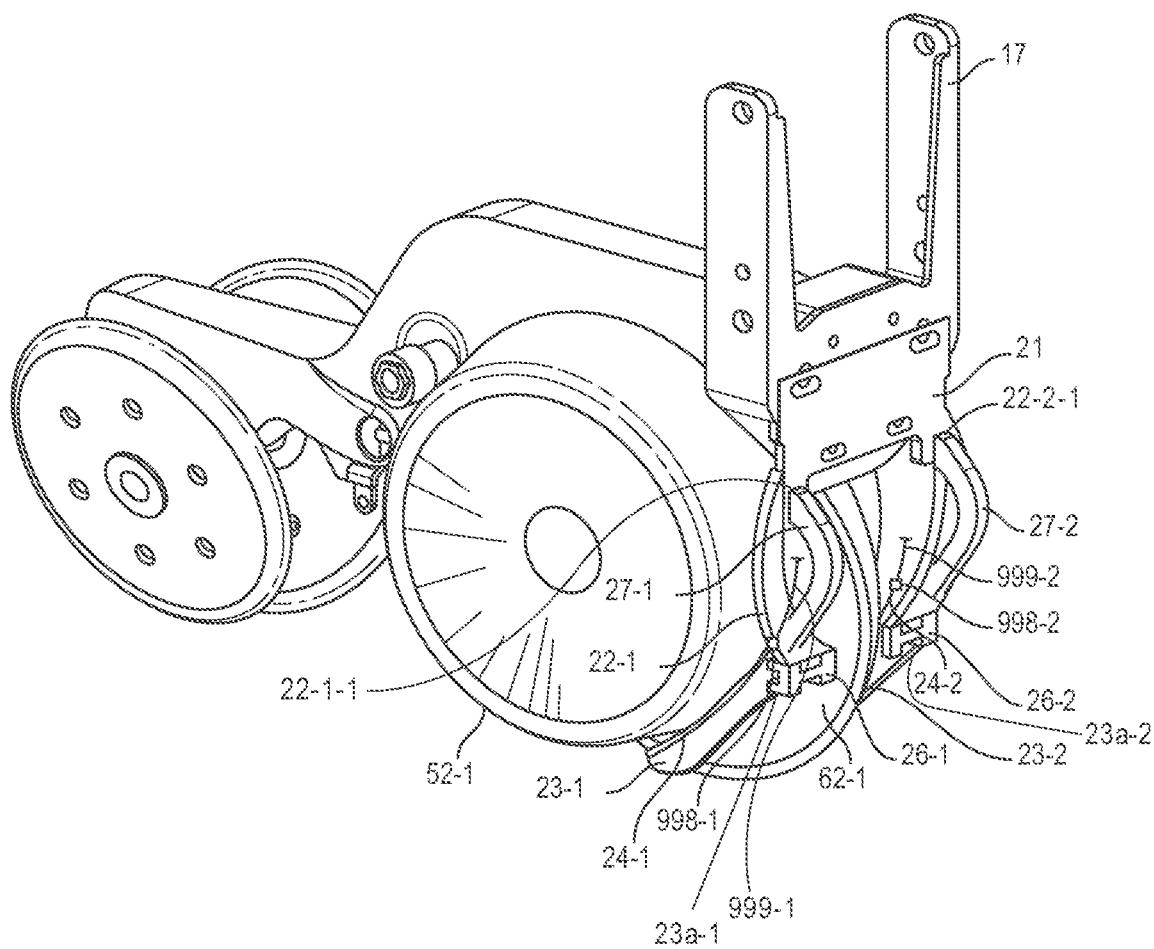
FIG. 5 is a perspective view of a row unit showing the knife assembly according to one embodiment.

As illustrated in FIGS. 3 to 5, a knife assembly 20 is disposed on row unit 10 (e.g., agricultural toolbar 10) according to one embodiment. Knife assembly 20 includes a knife bracket 21 that is attached to shank bracket 17. Knife assembly 20 can have one or two knives 23. Described herein is knife assembly 20 with two knives 23, but it is understood that one of these knives 23 can be omitted. This can be done when material is only desired to be delivered to one side of trench 3.

Knife bracket 21 has knife bracket arms 22-1, 22-2 extending downwardly from knife bracket 21 to knives 23-1 and 23-2 such that knife 23-1 is disposed ahead of the gauge wheel 52-1, and knife 23-2 is disposed ahead of the gauge wheel 52-2. Knife bracket arms 22-1, 22-2 have a first end 22-1-1 and 22-2-1, respectively, at their ends adjacent knife bracket 21, and they have a second end 22-1-2 and 22-2-2, respectively, opposite of the knife bracket 21. At second ends 22-1-2 and 22-2-2, knife bracket arms 22-1 and 22-2 can have a bracket 26-1 and 26-2, respectively, for mounting knives 23-1 and 23-2, respectively, at their first ends 23a-1 and 23a-2, respectively. Optionally, each knife bracket arm 21 can have a second arm 27-1 and 27-2 connecting first ends 22-1-1 and 22-2-1 to second ends 22-1-2 and 22-2-2, respectively. This optional second arm 27 can provide additional structural rigidity to bracket arm 22. Second arm 27 can be oriented transverse to bracket arm 22.

In another embodiment as illustrated in FIGS. 18A to 18C according to one embodiment, brackets 26-1 and 26-2 can be replaced with brackets 126-1 and 126-2, respectively. In FIGS. 18A to 18C, brackets 126-1 and 126-2 will be illustrated by bracket 126. As shown in FIG. 18A, knife 123 is pivotably mounted to bracket 126 through pivot 125. Knife 123 has tab 128 adjacent to pivot 125 for engaging force absorber 127. Force absorber 127 can be any structure that absorbs a force. Examples include, but are not limited to, springs, rubber springs, shock absorbers, and cylinders. Force absorber 127 is mounted to bracket 126 and disposed to engage tab 128. In operation, knife 123 through tab 128 engages force absorber 127. Knife 123 is free to pivot about pivot 125. When row unit 10 (e.g., agricultural toolbar 10) is lifted, knife 123 is free to pivot toward the ground under gravity as illustrated in FIG. 18B. Force absorbed has a selected resistance such that when knife 123 encounters a rock or hard soil, the increased force exerted against knife 123 by the rock or hard soil is transferred to force absorber 127 to compress and absorb the increased force without causing row unit 10 to lift as illustrated in FIG. 18C. In certain embodiments, an axis through pivot 125 that knife 123 pivots around is parallel or approximately parallel (within 10 degrees, within 5 degrees, or within 2 degrees) to the gauge wheel axle axis 57 (57-1, 57-2).

Knife 23 can be connected to knife bracket 21 to be any desired distance away from trench 3. In certain embodiments, the distance can be 1.25 cm to 10.2 cm (0.5 in. to 4 in.). In other embodiments, the distance can be 2.5 cm to 10.2 cm (1 in. to 4 in.). In certain embodiments, the distance is adjustable.

Each knife 23 (23-1, 23-2) has a material delivery conduit 24 (24-1, 24-2). Material delivery conduit 24 (24-1, 24-2) can be connected to a material distribution tube 999 (999-1, 999-2) via coupler 998 (998-1, 998-2). Material distribution tube 999 (999-1, 999-2) is in material communication with a material source (not shown) such as by gravity feed or by a pump (not shown). In one embodiment, knife 23 can be convex in a direction of travel 8000 as shown in FIGS. 8A to 8E with convex edge 29.

The material that can be delivered through the material delivery conduit 24 can be a fluid or a flowable solid. Flowable solids include, but are not limited to, granules and powders.

The knife 23 and/or knife bracket 21 can be configured such that the knife 23 is positioned to deposit material at any given depth below the soil surface 7. In certain embodiments, the depth is 1.25 cm to 3.8 cm (0.5 in. to 1.5 in.)

Figure 6:
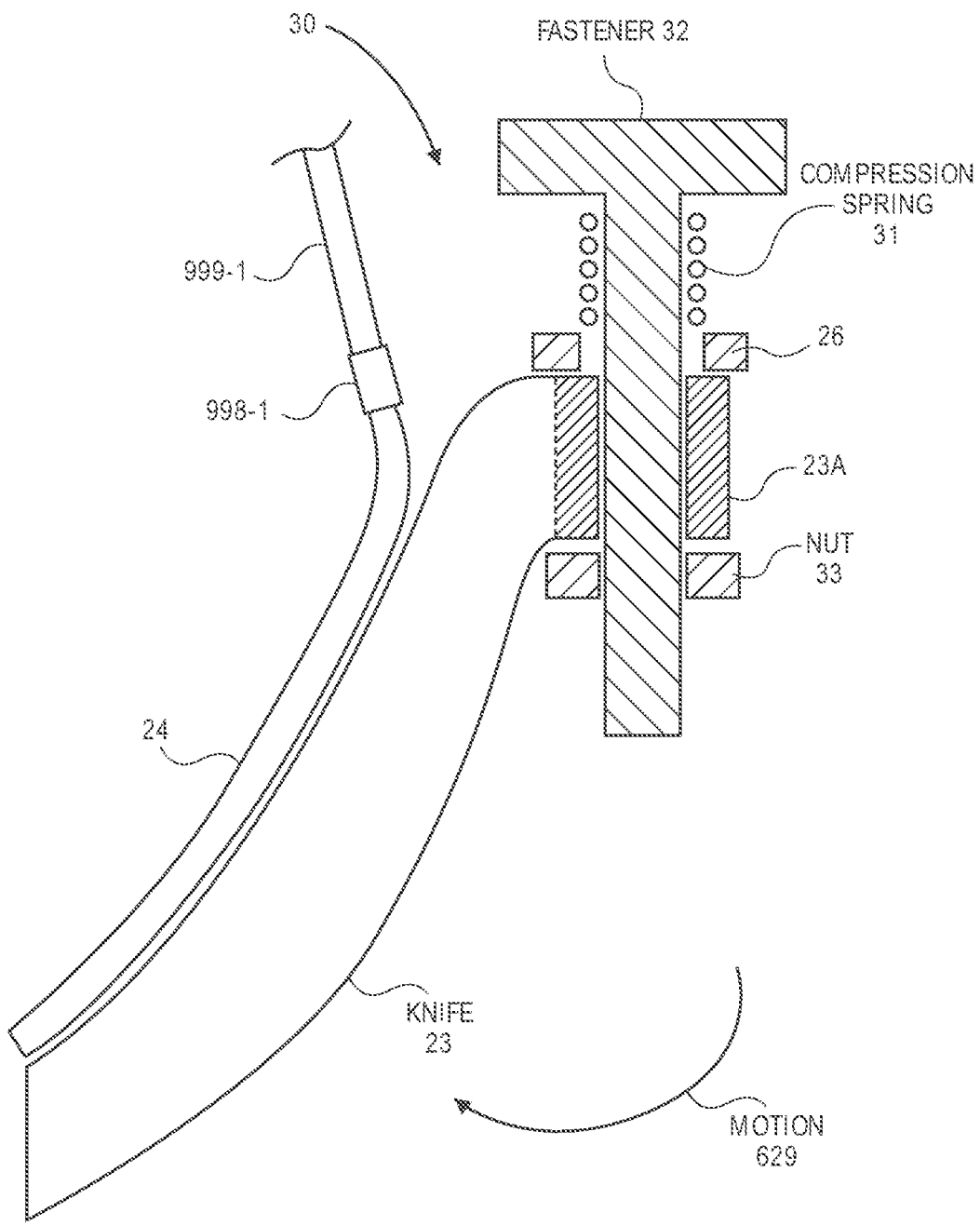
FIG. 6 is a side elevation view of a knife coupled to a bracket with a relief system according to one embodiment.
Figure 7:
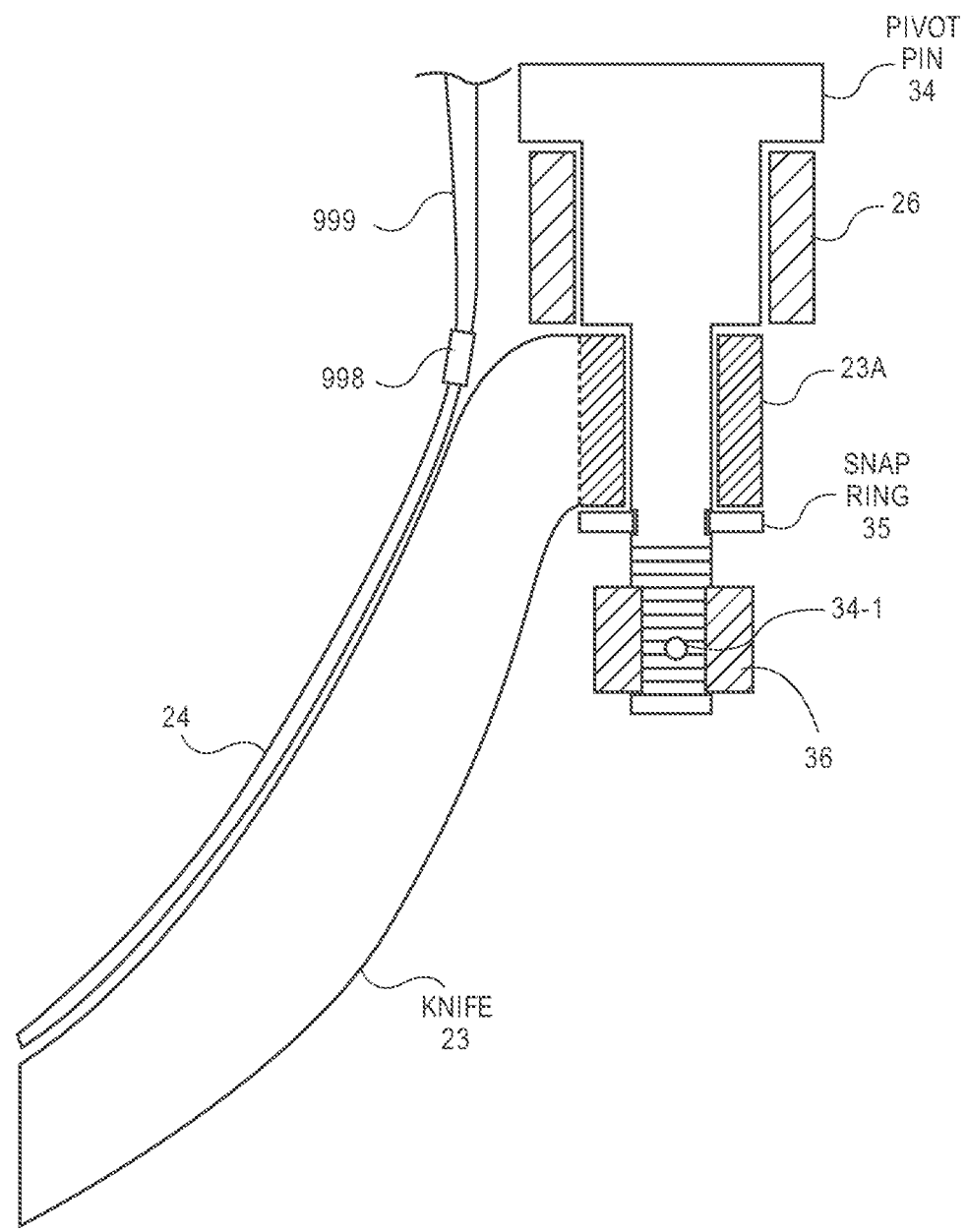
FIG. 7 is a side elevation view of a knife coupled to a bracket with an alternative relief system according to one embodiment.
Figures 8A, 8B:
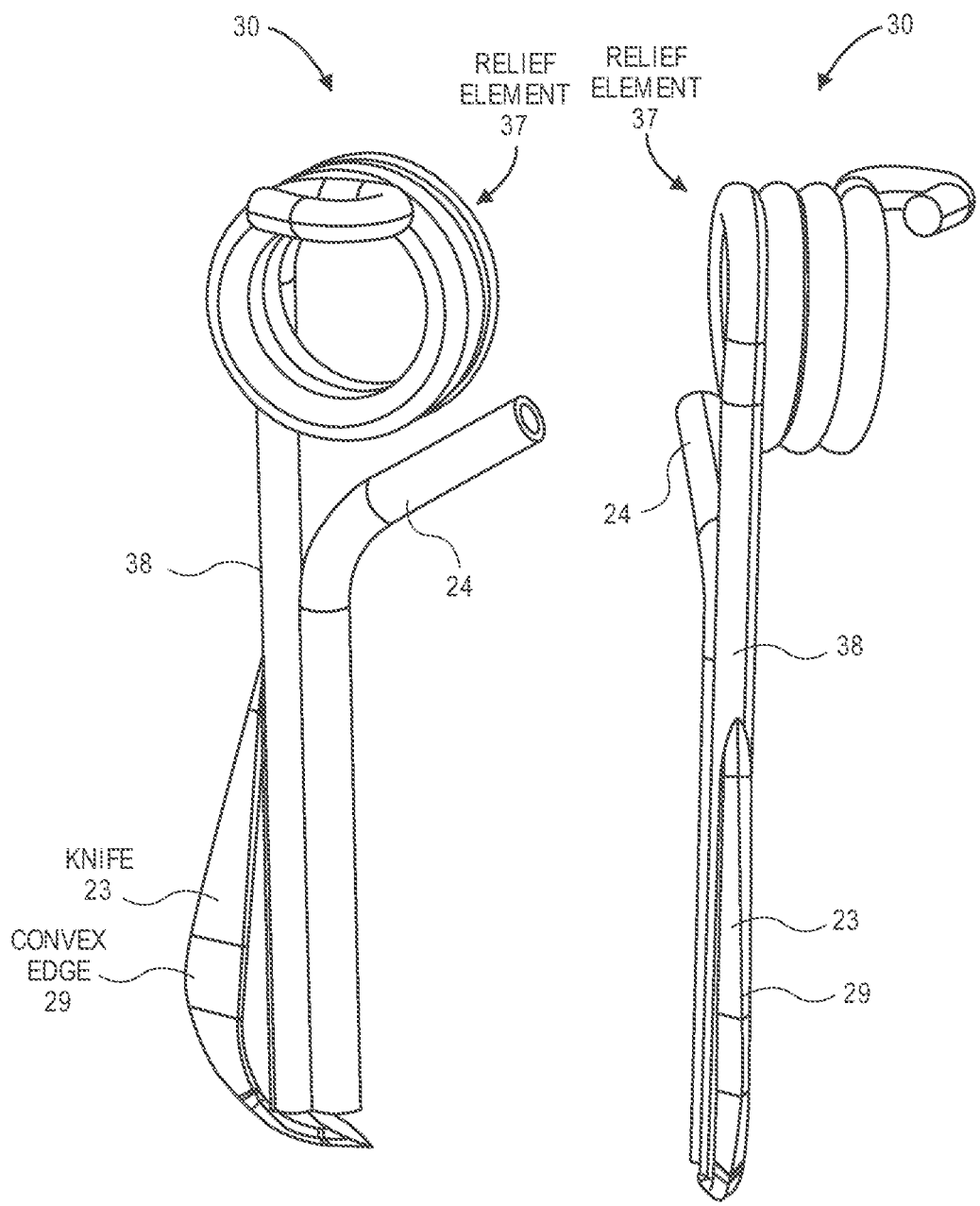
FIG. 8A is a left side perspective view of an embodiment of an adjacent trench liquid delivery system according to one embodiment.
FIG. 8B is a front perspective view of the adjacent trench liquid delivery system of FIG. 8A according to one embodiment.

In one embodiment, a relief system 30 can be disposed to allow knife 23 to pivot with a break-away motion 629. In FIG. 6, relief system 30 is shown. Knife 23 is attached to bracket 26 with a fastener 32 and nut 33. A compression spring 31 is disposed around fastener 32. In FIG. 7, a pivot pin 34 couples knife 23 to bracket 26, and pivot pin 23 can be adjusted vertically by nut 36 and held in place by snap ring 35. Pivot pin 34 can have a hole 34-1 for accepting a pin (not shown), such as a cotter pin, to keep nut 36 from not rotating.

FIGS. 8A to 8E show an alternative embodiment of knife 23, material delivery conduit 24, and relief system 30. Examples of these knives can be found in PCT/US2016/037701. Relief system 30 has relief element 37 and downwardly extending element 38. Knife 23 is secured to downwardly extending element 38, and material conduit 24 is positioned on a rearward portion of downwardly extending element 38.

Figures 9A, 9B:
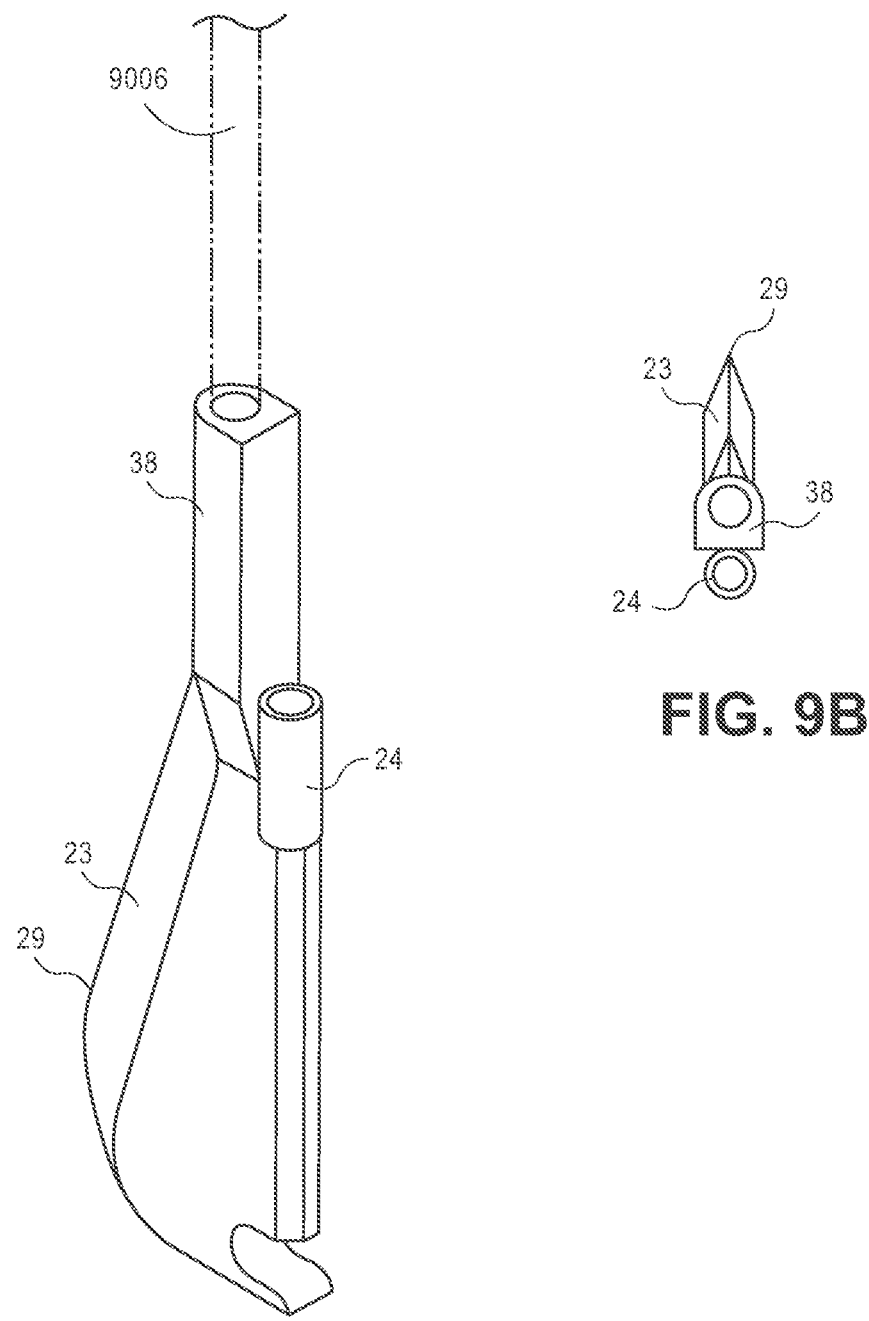
FIG. 9A is a rear perspective view of another embodiment of an adjacent trench liquid delivery system in which the knife is formed integral with the liquid delivery tube according to one embodiment.
FIG. 9B is top plan view of the adjacent trench liquid delivery system of FIG. 9A according to one embodiment.

FIGS. 9A and 9B show an alternative in which knife 23, downwardly extending element 38, and material conduit 24 are made as a unitary part.

Figure 10A:
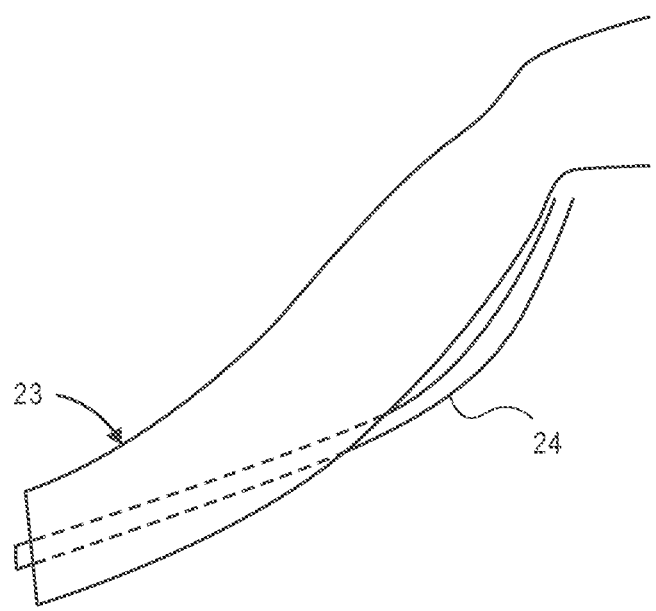
FIG. 10A is a side elevation view of the knife with the material conduit disposed through the knife according to one embodiment.
Figure 10B:
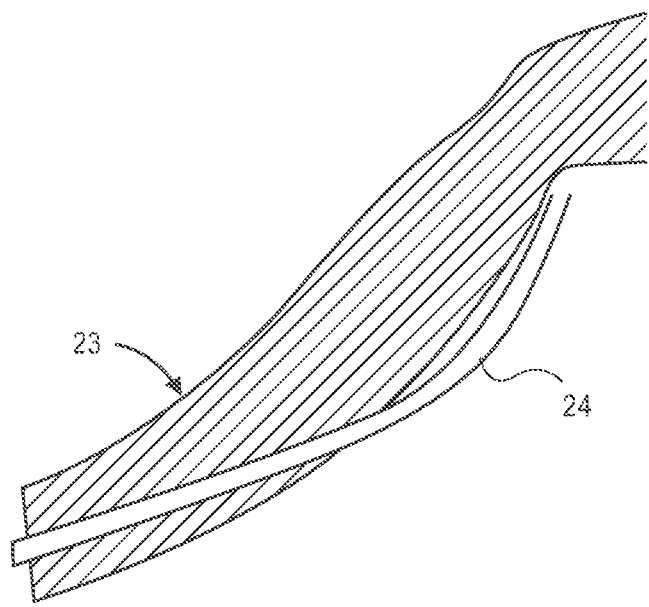
FIG. 10B is a cross-sectional view of the knife with the material conduit disposed through the knife according to one embodiment.

FIGS. 10A and 10B show an alternative in which material conduit 24 is disposed through knife 23.

In some embodiments, a distance between knife 23 and gauge wheel 52 can be up to 15 cm (6 inches). A minimum distance is any distance such that gauge wheel 52 does not contact knife 23. In other embodiments, the distance is up to 7.5 cm. These distances are during operation. When not in operation, such as when the row unit is lifted, the knife 23 can contact gauge wheel 52.

A benefit of the knife 23 disposed ahead the gauge wheel 52 is that the row unit 10 (e.g., agricultural toolbar 10) does not become longer. This allows for better turning at the end of the rows. Also, the close proximity to the gauge wheel 52 allows the gauge wheel 52 to pull away any crop residue that becomes entangled with the knife 23. As the gauge wheel 52 engages the ground, any crop residue that is between the gauge wheel 52 and the ground is pulled by gauge wheel 52 away from knife 23. Also, accumulated mud can be pulled away.

The arrangement of the knife 23 adjacent to the gauge wheel 52 is easy to construct, compact in size, easy to install on various types of row units 10, low maintenance, economical, minimizes furrow disturbance, great for starter fertilizer and/or nitrogen placement, allows for dual banding with separate liquids going to knives 23 on both gauge wheels 52, provides consistent vertical placement, and provides consistent lateral placement.

Figure 11:
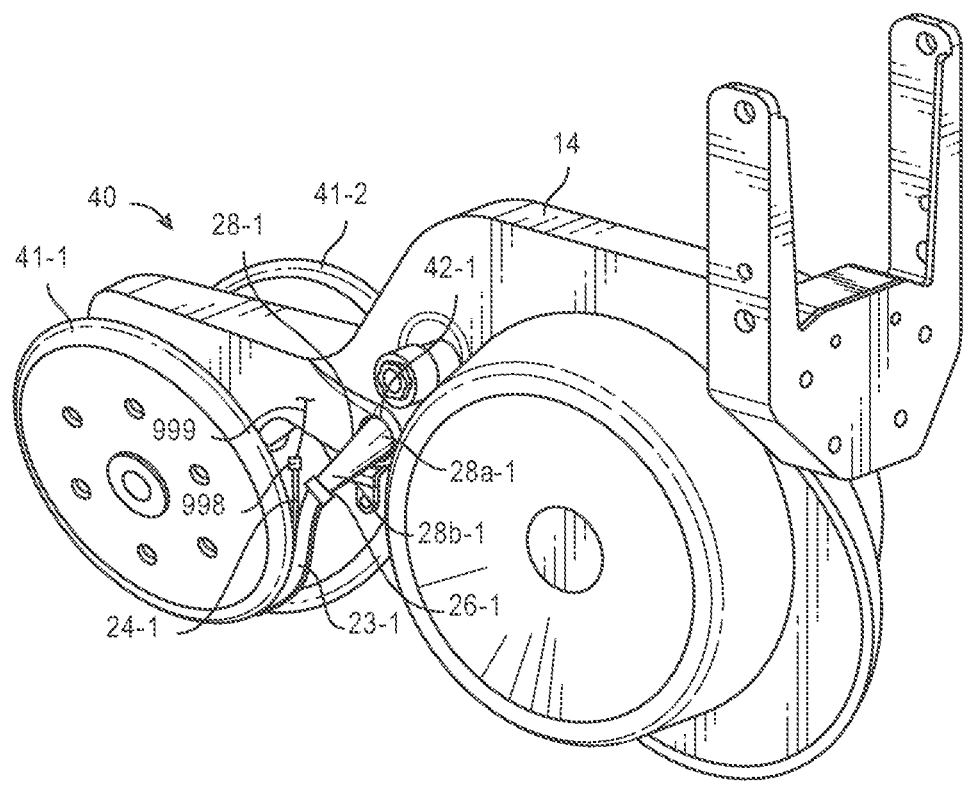
FIG. 11 is a perspective view of a row unit showing the knife assembly according to one embodiment.

The system described above is for placement ahead of the gauge wheel 52. The same system can also be placed ahead of a closing wheel 41. FIG. 11 shows the knife 23 disposed ahead of closing wheel 41-1. While illustrated as being disposed ahead of closing wheel 41-1, the knife 23 can be disposed ahead of closing wheel 41-2 or both closing wheels 41-1 and 41-2. A bracket arm 28-1 is attached to closing system 40 at its first end 28a-1. In one embodiment, bracket arm 28-1 attaches to connection point 42-1 where closing system 40 attaches to frame 14. Bracket arm 28-1 extends generally transversely away from closing system 40. At second end 28b-1 of bracket arm 28-1, bracket arm 28-1 can have a bracket 26-1. Knife 23 can connect to second end 28b-1 or through bracket 26-1 to bracket arm 28-1. As described above, knife 23 has a material delivery conduit 24. Material delivery conduit 24 can be connected to a material distribution tube 999 via coupler 998. Material distribution tube 999 is in material communication with a material source (not shown) such as by gravity feed or by a pump (not shown). In one embodiment, knife 23 can be convex in a direction of travel 8000 as shown in FIGS. 8A to 8E with convex edge 29.

Figure 12:
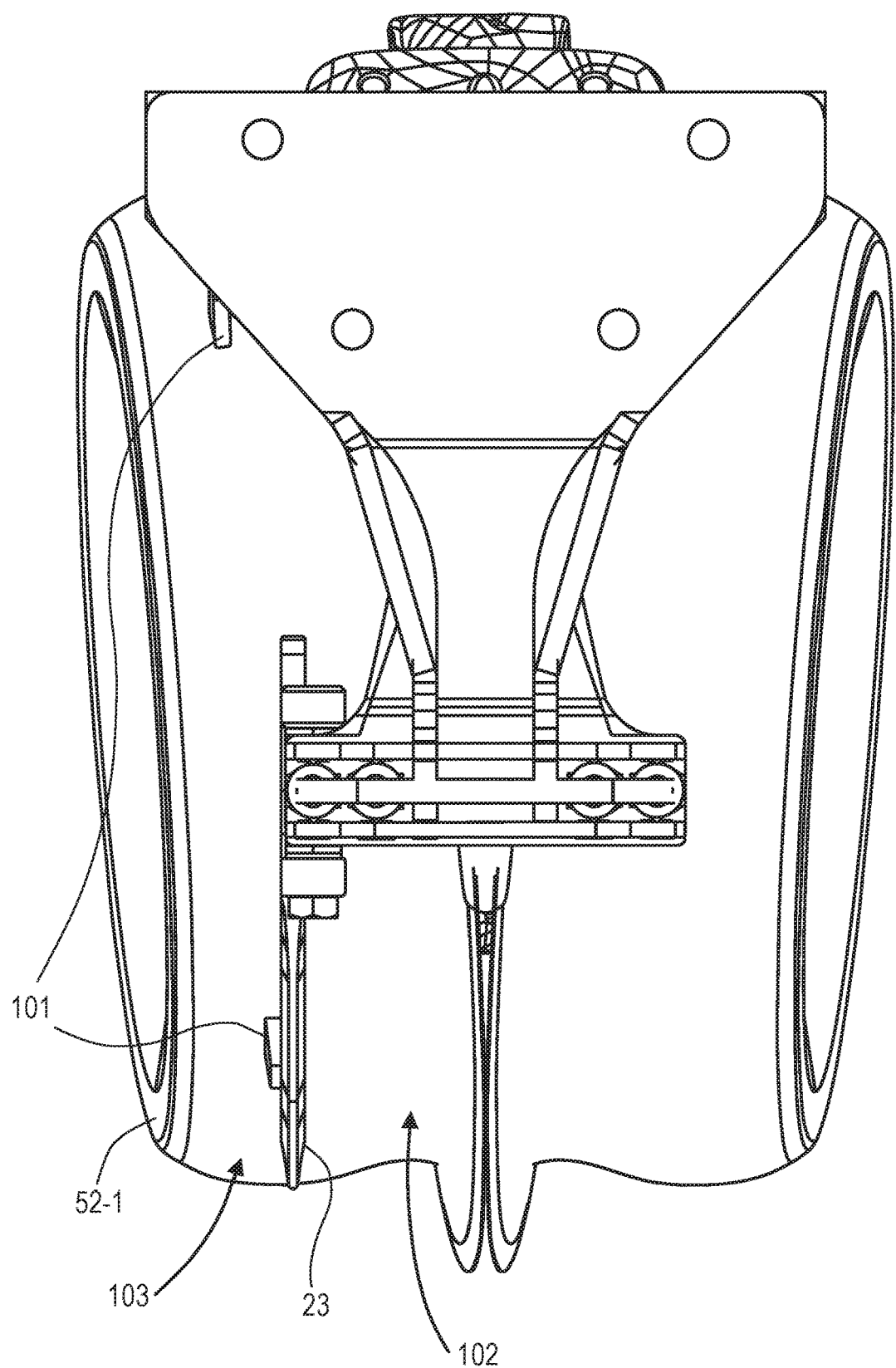
FIG. 12 is an end view of a row unit showing protrusions on a gauge wheel according to one embodiment.
Figure 13:
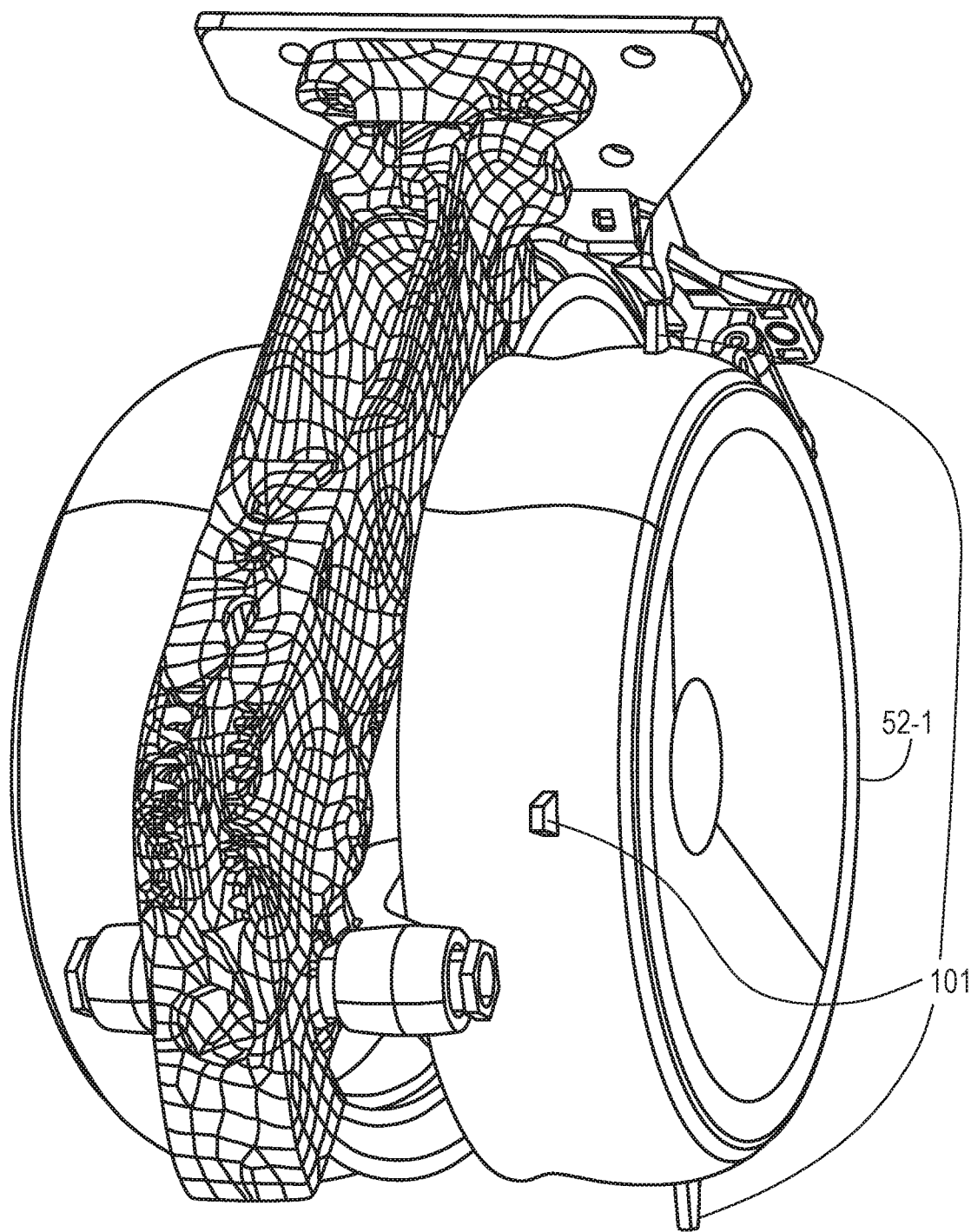
FIG. 13 is a perspective view of the row unit of FIG. 10 showing protrusions on the gauge wheel according to one embodiment.

In another embodiment as shown in FIGS. 12 and 13, gauge wheel 52 (52-1 and 52-2) can have one or more protrusions 101 disposed about its circumference and extending radially from a center of the gauge wheel 52. The protrusion 101 can disposed on gauge wheel 52 such that as gauge wheel 52 rotates, the protrusion 101 passes in close proximity to knife 23 (23-1 and 23-2). The protrusion 101 can either pass to the side of knife 23 proximate to opening disc 62 (inner side 102), to the opposite side of knife 23 (outer side 103), or to both. When disposed on both inner side 102 and outer side 103, protrusions 101 on both sides can be aligned to pass knife 23 simultaneously or at separate times. Protrusions 101 are preferably disposed to outer side 103. A distance between knife 23 and protrusion 101 can be any selected distance. In one embodiment, the distance is 1 mm to 5 cm. The height of protrusion 101 measured radially away from the outer circumference of gauge wheel 52 is at least 1 cm. In one embodiment, protrusions 101 extend at least 50% across the knife 23. Protrusions 101 assist in removing any debris that builds up around knife 23 by catching and dragging debris away from knife 23.

Figure 14:
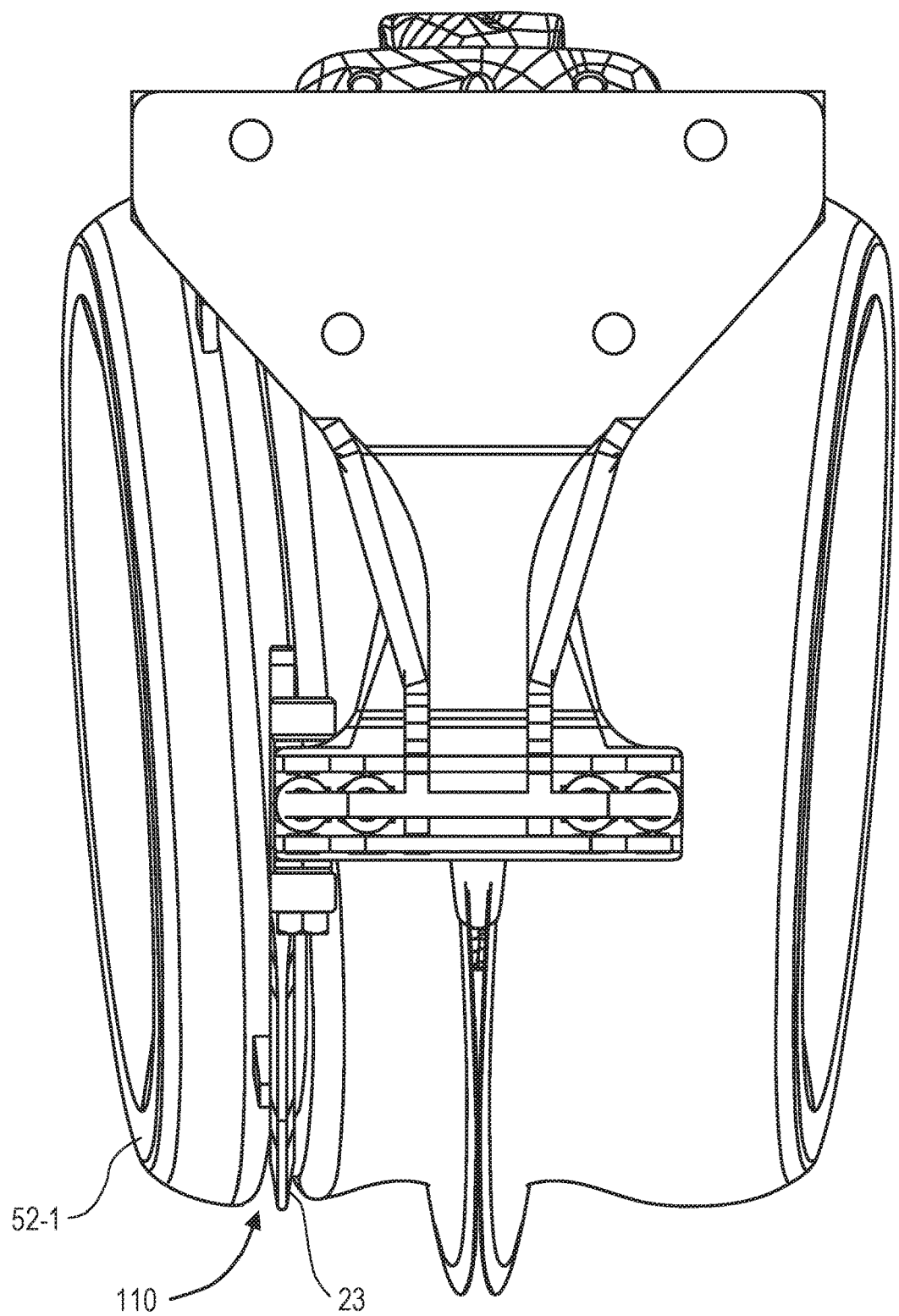
FIG. 14 is an end view of a row unit showing a channel in a gauge wheel according to one embodiment.
Figure 15:
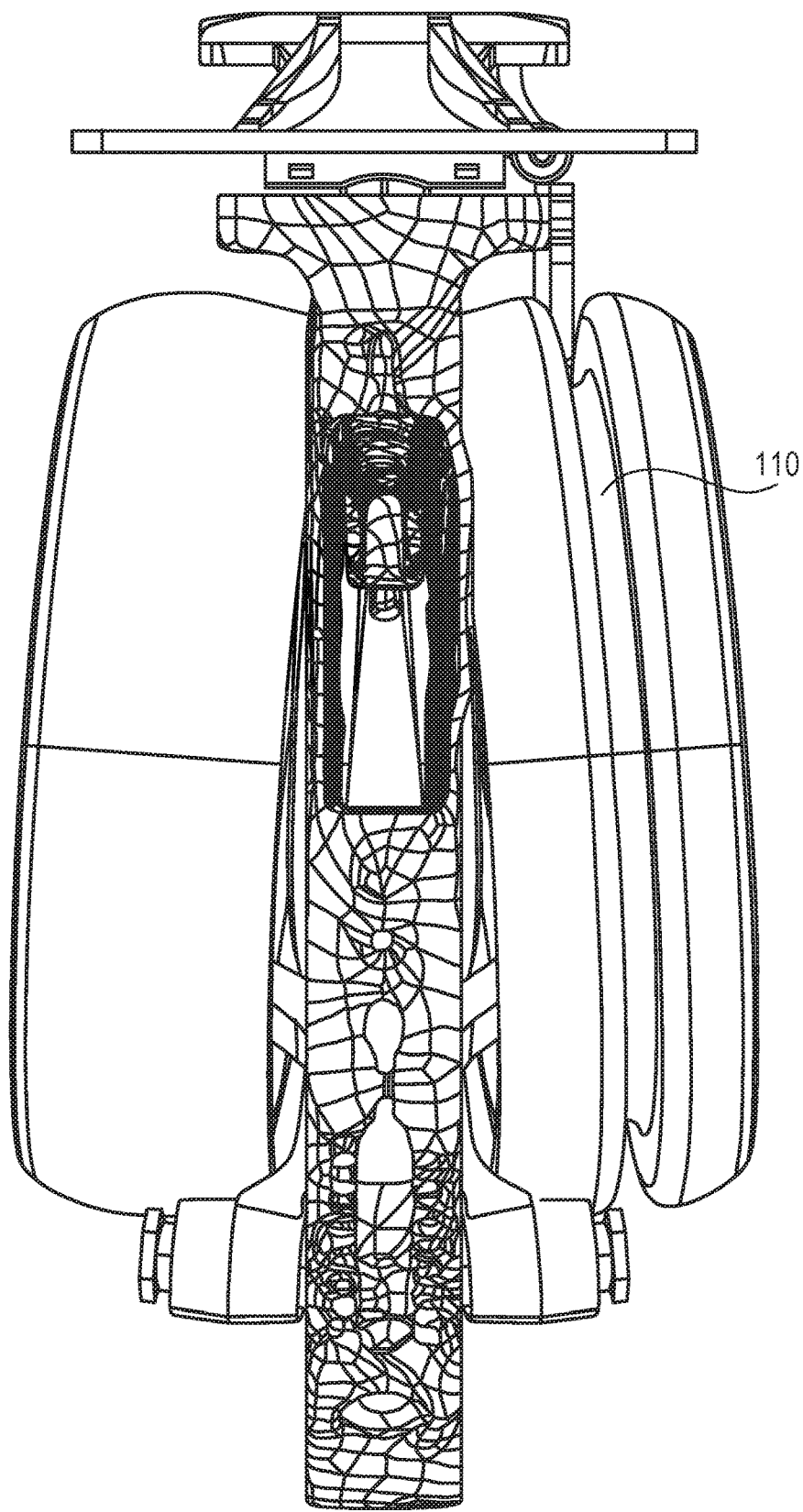
FIG. 15 is a top plan view of the row unit of FIG. 14 showing the channel in the gauge wheel according to one embodiment.
Figure 16:
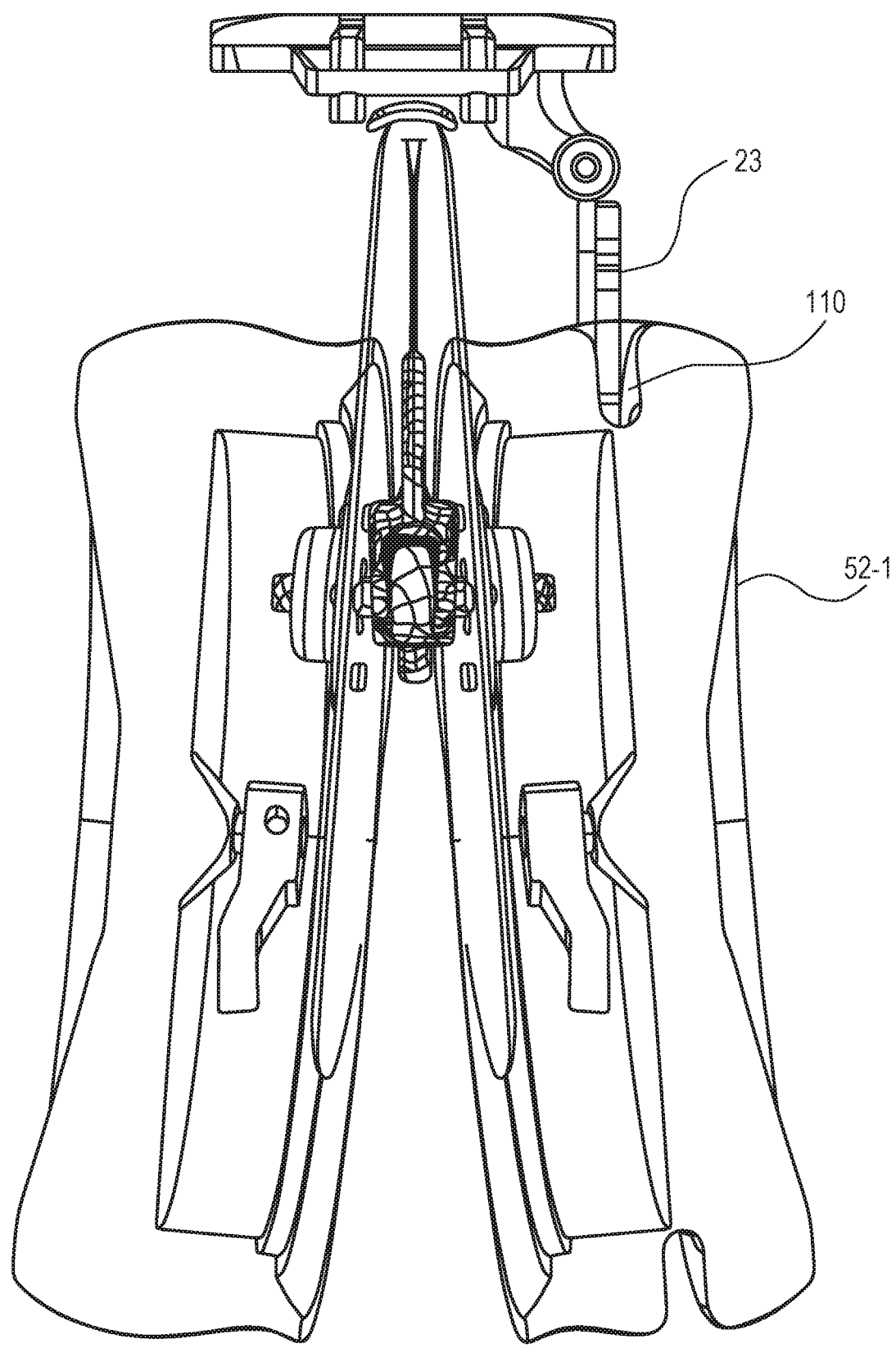
FIG. 16 is a top section view of the row unit of FIG. 14 showing the channel in the gauge wheel according to one embodiment.

In another embodiment shown in FIGS. 14 to 16, gauge wheel 52 (52-1 or 52-2) has a channel 110 extending radially inward from the circumference of gauge wheel 52 towards the center of gauge wheel 52. Channel 110 is disposed to at least partially to fully accept knife 23 within the channel 110. The channel 110 can be disposed to approximately or nearly fully accept the knife within the channel. By having knife 23 disposed within channel 110, debris build up around knife 23 is reduced or eliminated.

Both of the previous embodiments for protrusions 101 and channel 110 can be combined together.

Figure 17:
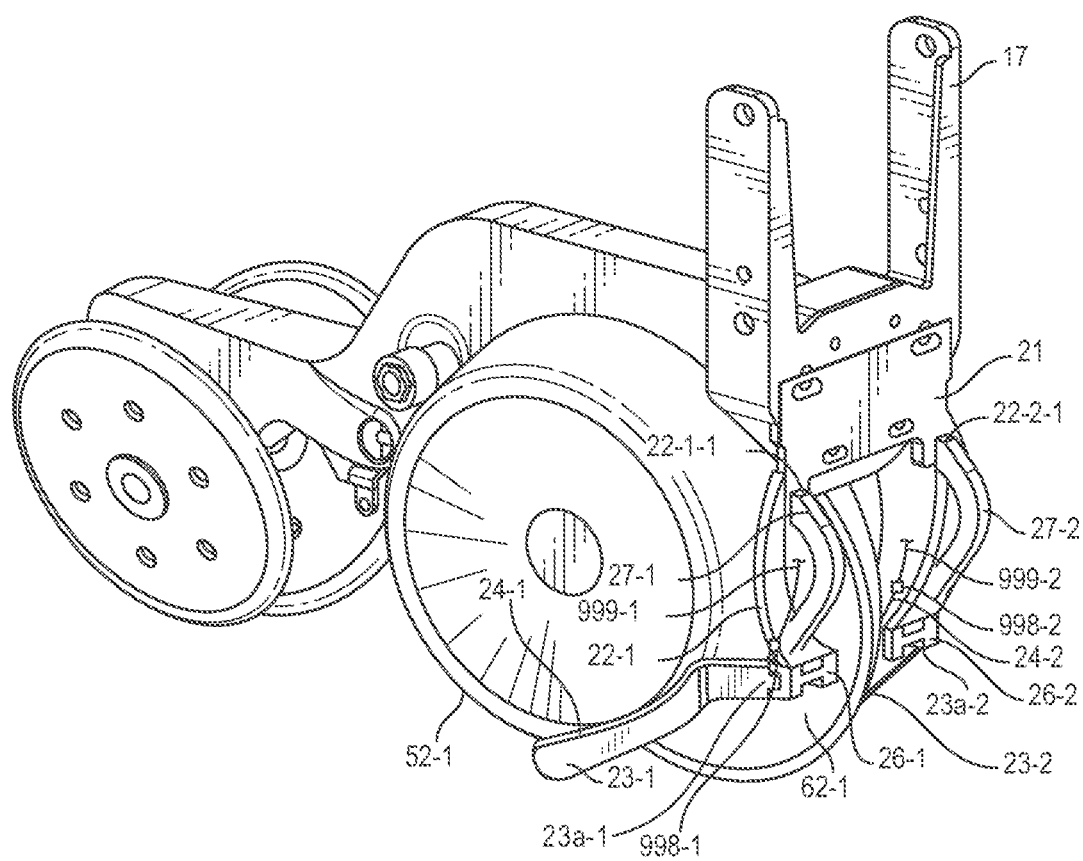
FIG. 17 is a perspective view of a row unit with a knife disposed adjacent to a wheel according to one embodiment.
Figure 19A:
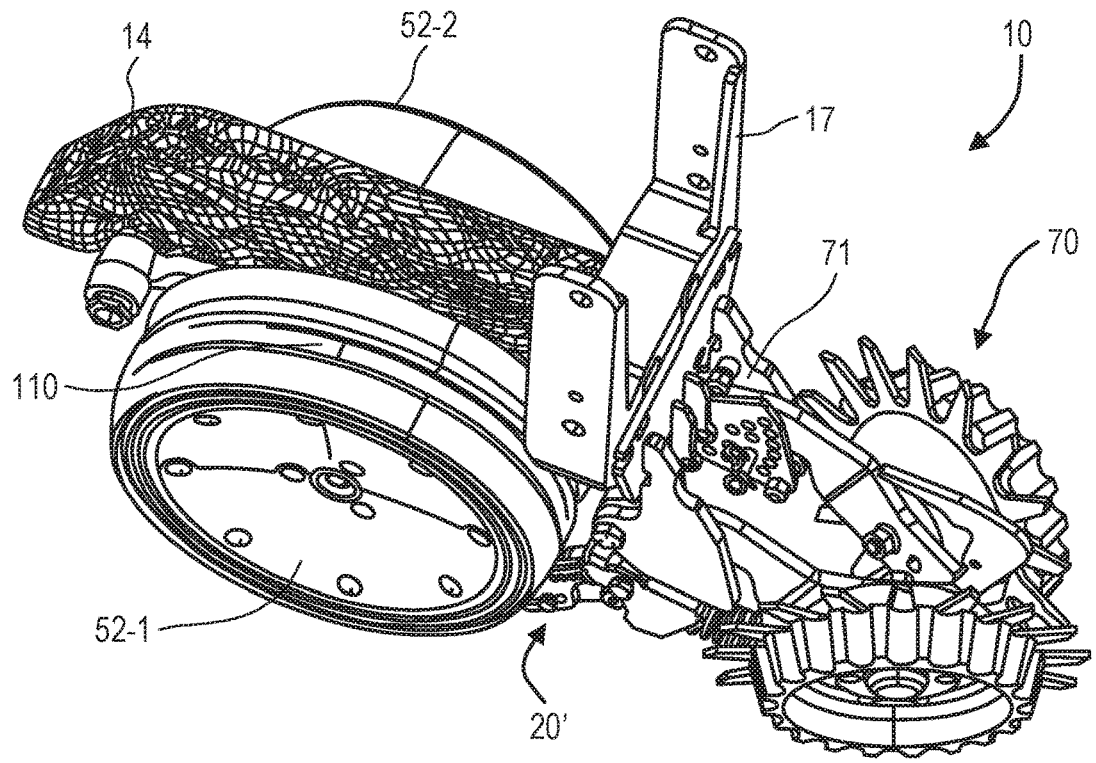
FIG. 19A is a perspective view of a row unit according to one embodiment.
Figure 19B:
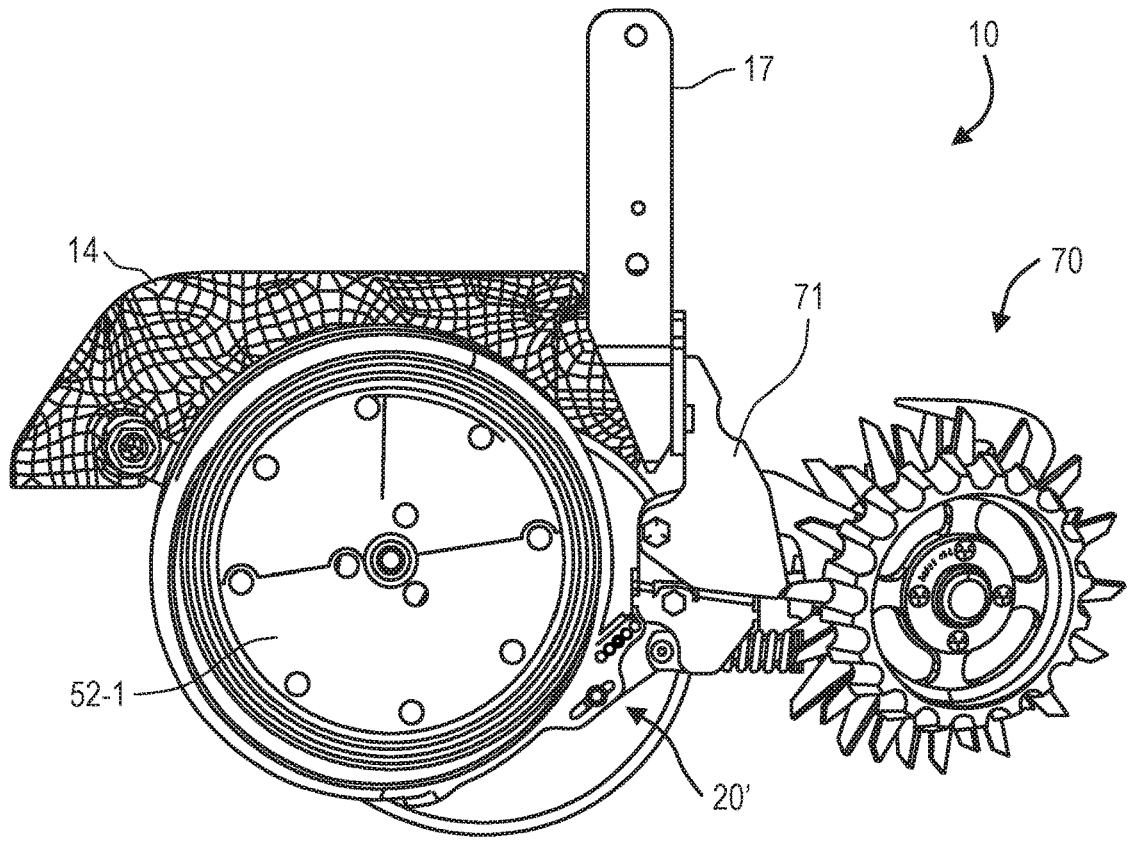
FIG. 19B is a right side view of the row unit of FIG. 19A according to one embodiment.
Figure 20A:
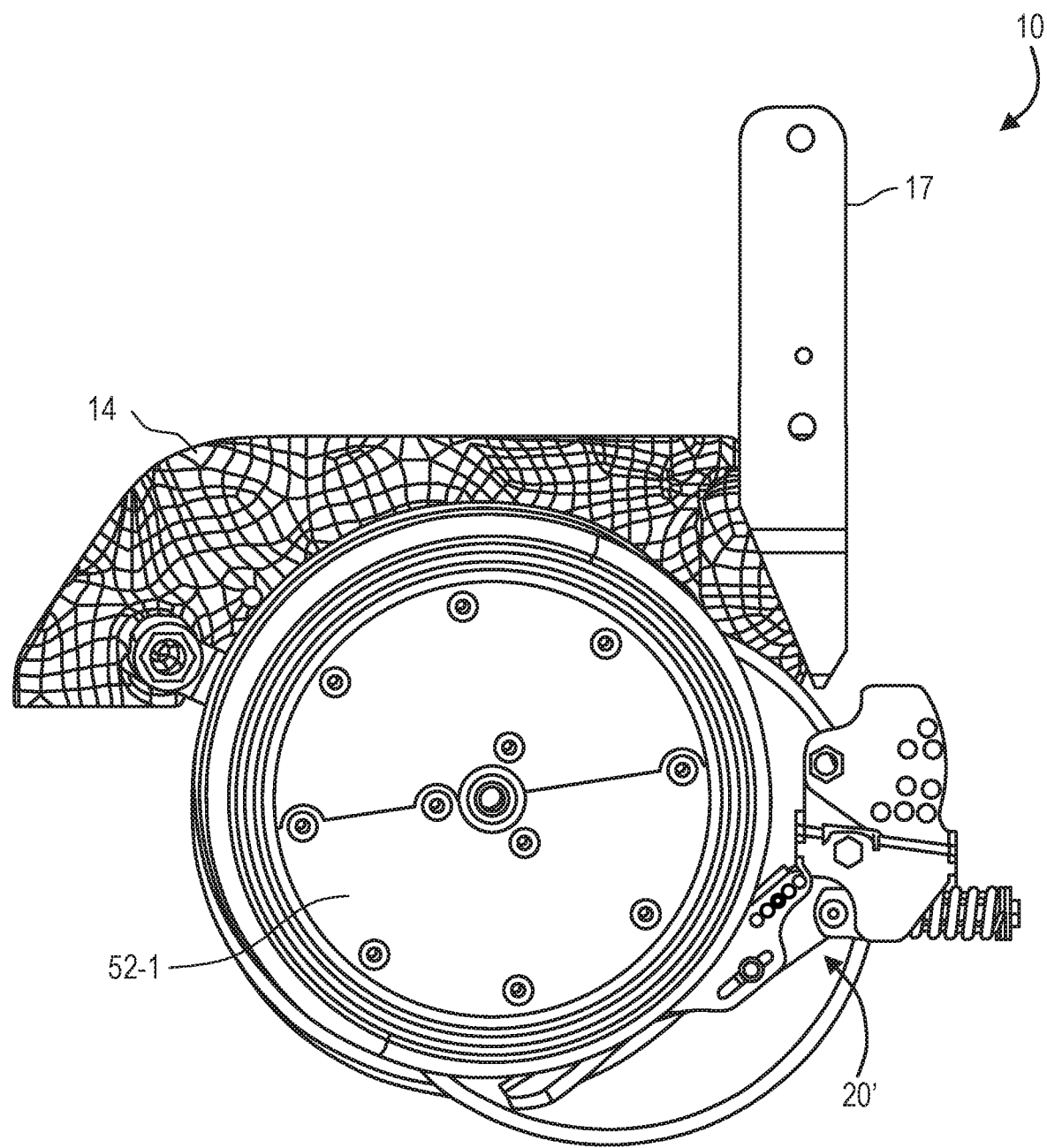
FIG. 20A is a right side elevation view of the row unit of FIG. 19B with the optional row cleaner removed according to one embodiment.
Figure 20B:
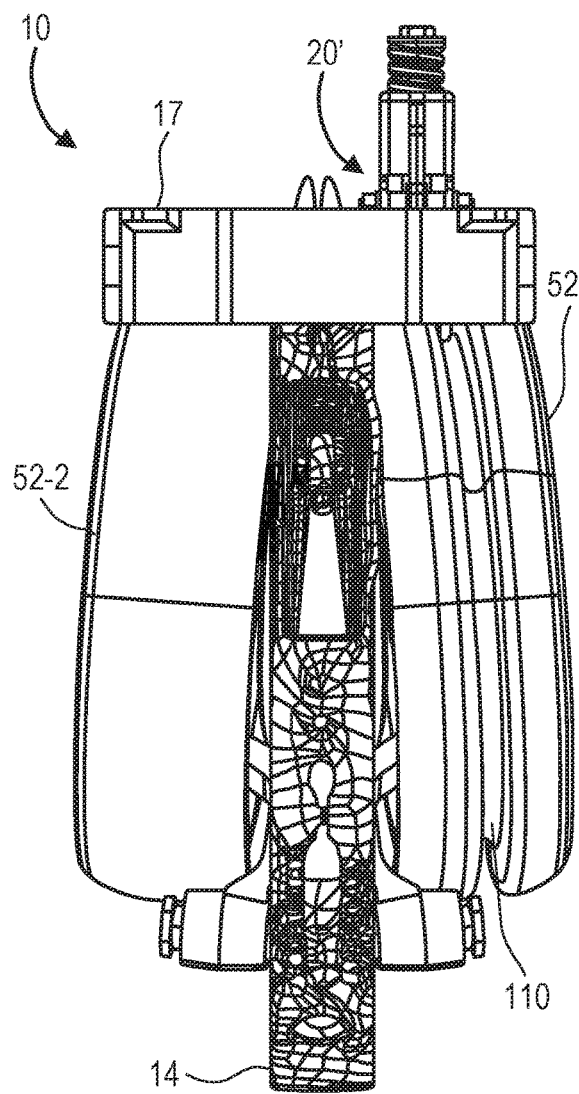
FIG. 20B is a top plan view of the row unit of FIG. 20A according to one embodiment.
Figure 20C:
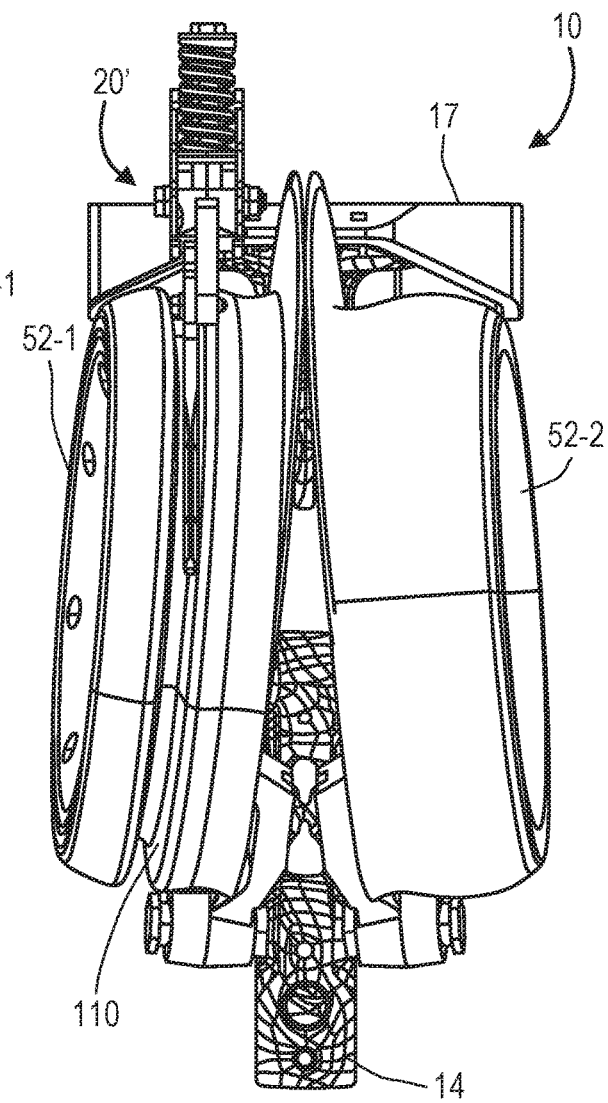
FIG. 20C is a bottom elevation view of the row unit of FIG. 20A according to one embodiment.
Figure 21E:
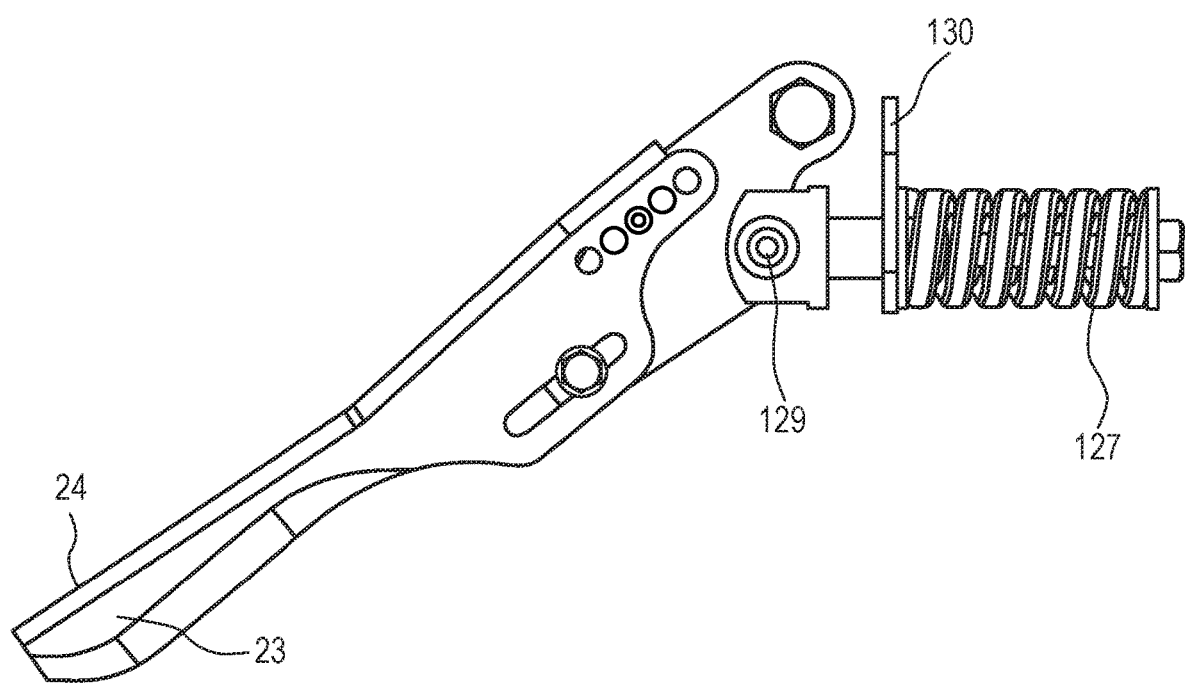
FIG. 21E is a right elevation view of the knife assembly of FIG. 21B with the bracket removed to view the relief according to one embodiment.

In another embodiment as shown in FIG. 17, knife 23 is disposed adjacent to an outside edge 120 of gauge wheel 52 (52-1 and 52-2) and proximate to the circumference of gauge wheel 52. This embodiment allows the motion of gauge wheel 52 to pull debris away from knife 23. The lateral distance between knife 23 and gauge wheel 52 can be 1 mm up to 10 cm including any subset of ranges from 1 mm up to 10 cm.

Another embodiment of a row unit 10 (e.g., agricultural toolbar 10) is illustrated in FIGS. 19A to 21E. In this embodiment, row unit 10 further includes an optional cleaning system 70. Cleaning system 70 is attached to row unit 10 at shank bracket 17 via cleaning system bracket 71. Knife assembly 20' connects to cleaning system bracket 71. Knife assembly 20' includes knife bracket 21', which connects to cleaning system bracket 71. Knife 23 is pivotably connected to knife bracket 21', and delivery conduit 24 is disposed on knife 23. A force absorber 127' is pivotably connected to knife 23 at pivot 129. As best viewed in FIG. 21E with knife bracket 21 removed, a stop 130 is disposed about force relief 127'. Stop 130 is fixedly in connection with knife bracket 21' for force relief 127' to act against stop 130.

While the above embodiments illustrate the knife 23 with gauge wheels 52 or closing wheels 41, the knife 23 can be used with any wheel on an agricultural toolbar. Examples of agricultural toolbars include, but are not limited to, row units, air seeders, air drills, side dress bars, tillage toolbars, and fertilizer toolbars.

Figure 22A:
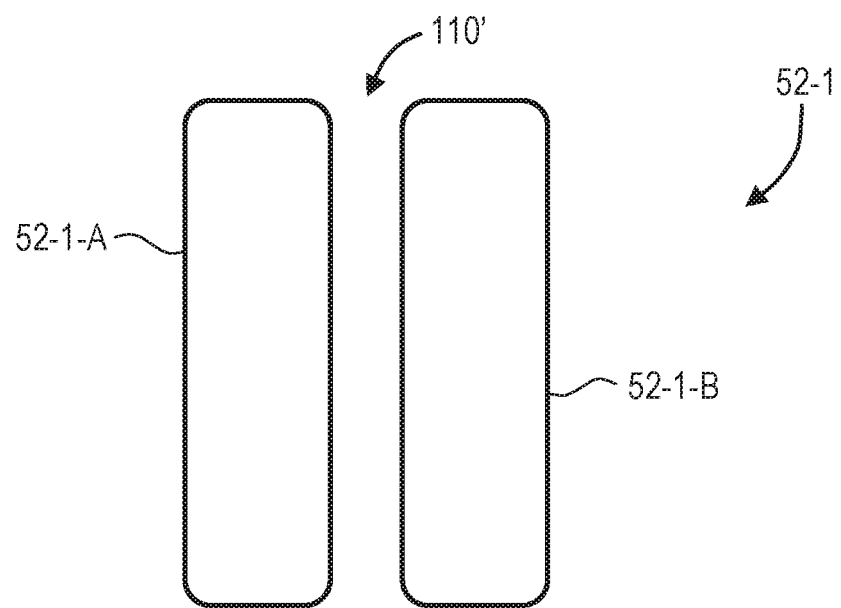
FIG. 22A is a top plan view of an alternate wheel with a channel formed from two wheels according to one embodiment according to one embodiment.

In an alternative embodiment, channel 110 can be created by two wheels placed next to each other and spaced apart to accept a knife 23 between them. In one embodiment illustrated in FIG. 22A, gauge wheel 52-1 includes first wheel 52-1-A and second wheel 52-1-B with the space between first wheel 52-1-A and second wheel 52-1-B forming the channel 110'. In this embodiment, gauge wheels 52-1-A and 52-1-B can be disposed on a common axle connected to gauge wheel arm 53-1 (not shown).

Figure 22B:
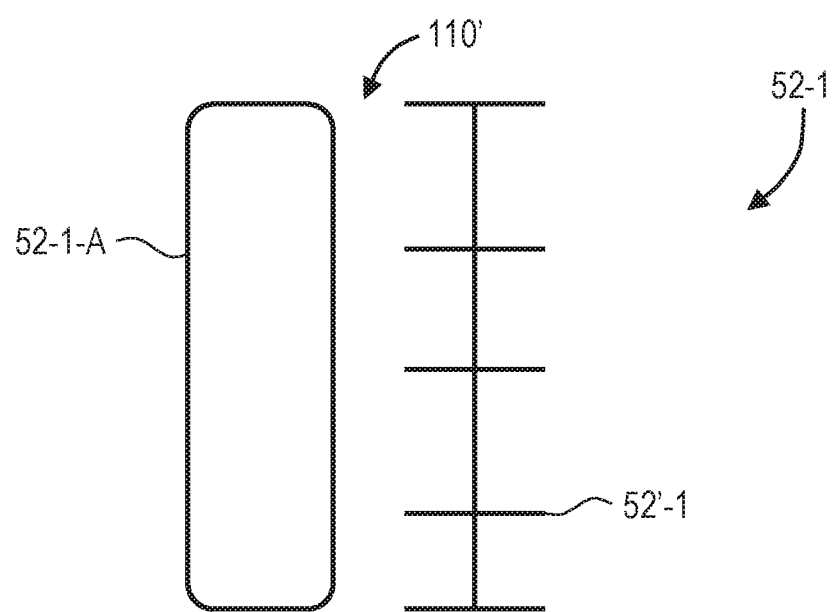
FIG. 22B is a top plan view of an alternate wheel with a channel formed from two wheels with at least one wheel being a finger wheel according to one embodiment.

In an alternative embodiment, one or both of gauge wheels 52-1-A and 52-1-B can be replaced by a finger wheel 52'. A finger wheel is described in U.S. Pat. No. 5,970,891, which is incorporated herein by reference in its entirety. As illustrated in FIG. 22B, the finger wheel 52'-1 is disposed on the outside opposite the opening disc 62-1. Finger wheel 52' allows for soil flow by fluid injector 80. In this embodiment, gauge wheel 52-1-A and finger wheel 52'-1 can be disposed on a common axle connected to gauge wheel arm 53-1 (not shown).

Figure 28:
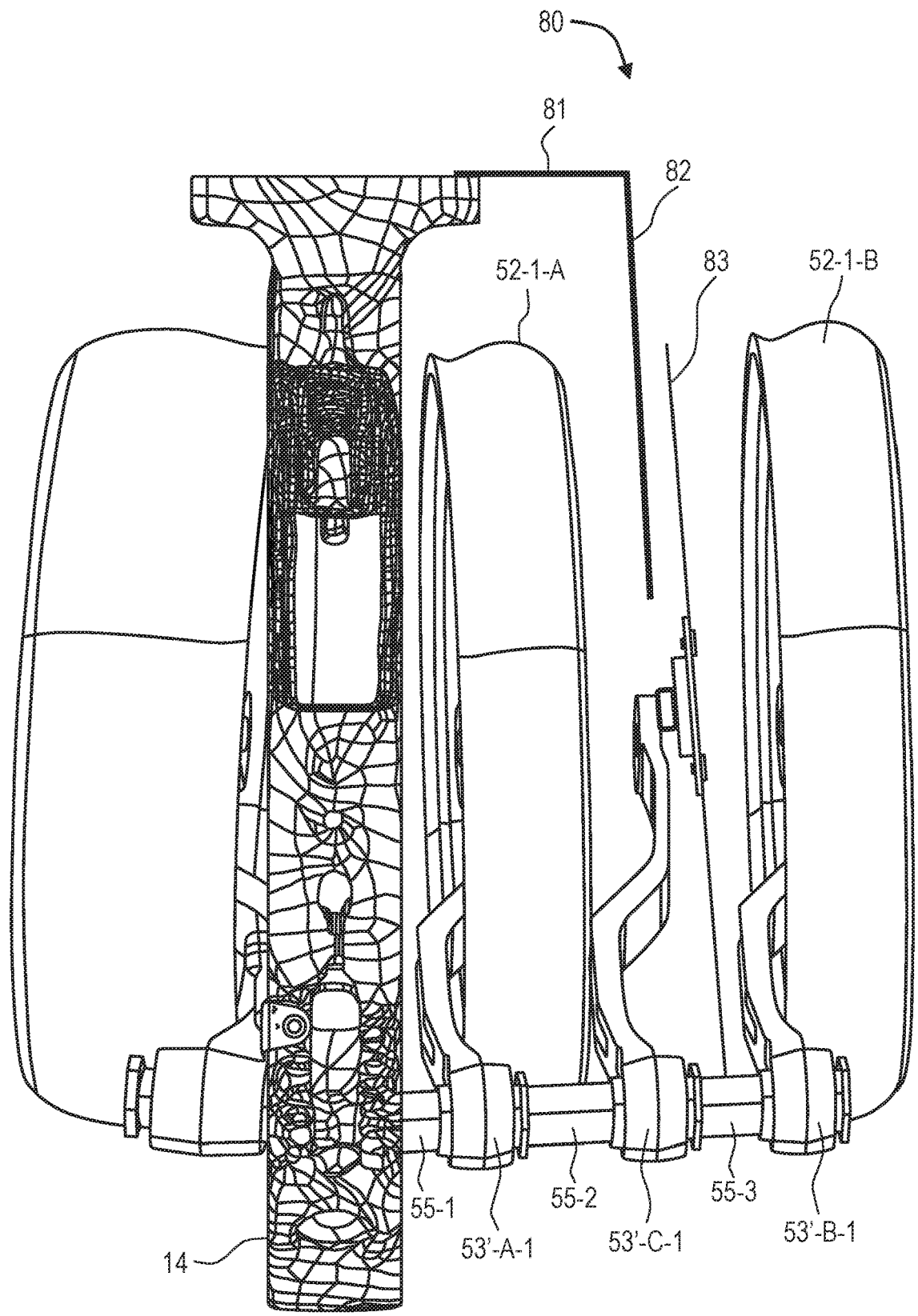
FIG. 28 is a top plan view of disposing two wheels on separate gauge wheel arms and optionally disposing a coulter on a separate gauge wheel arm according to one embodiment.

In another embodiment illustrated in FIG. 28, first wheel 52-1-A and second wheel 52-1-B (or finger wheel 52') can be disposed on separate gauge wheel arms 53'-A-1 and 53'-B-1. Also illustrated in FIG. 28, fluid injector 80 is coulter 83 and fluid delivery tube 82. Coulter 83 is disposed on a separate gauge wheel arm 53'-C-1. In this embodiment, first wheel 52-1-A and second wheel 52-1-B can be disposed on a common axle (e.g., axle 55-1-A, axle 55-2, 55-3) connected to gauge wheel arms.

Figure 23:
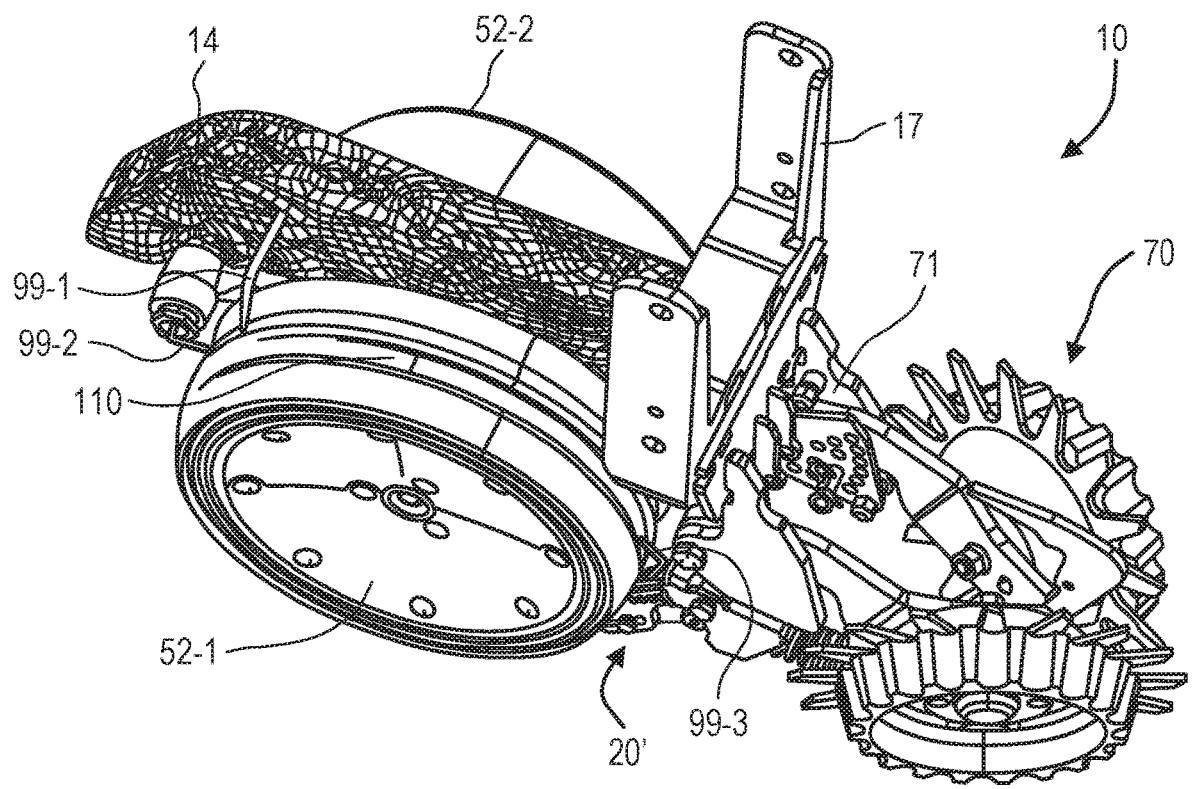
FIG. 23 is a perspective view of a toolbar with a scraper mounted to the frame and disposed in the channel according to one embodiment.

In another embodiment, FIG. 23 illustrates how a scraper 99-a can be mounted to the agricultural toolbar (e.g., frame 14 of row unit 10 or any position on row unit 10) and positioned to be disposed in channel 110 or 110' to remove any debris that accumulates in channel 110 or 110'. In other embodiments, scraper 99-b can be disposed on gauge wheel arm 54 or scraper 99-c on knife 23.

Figure 24:
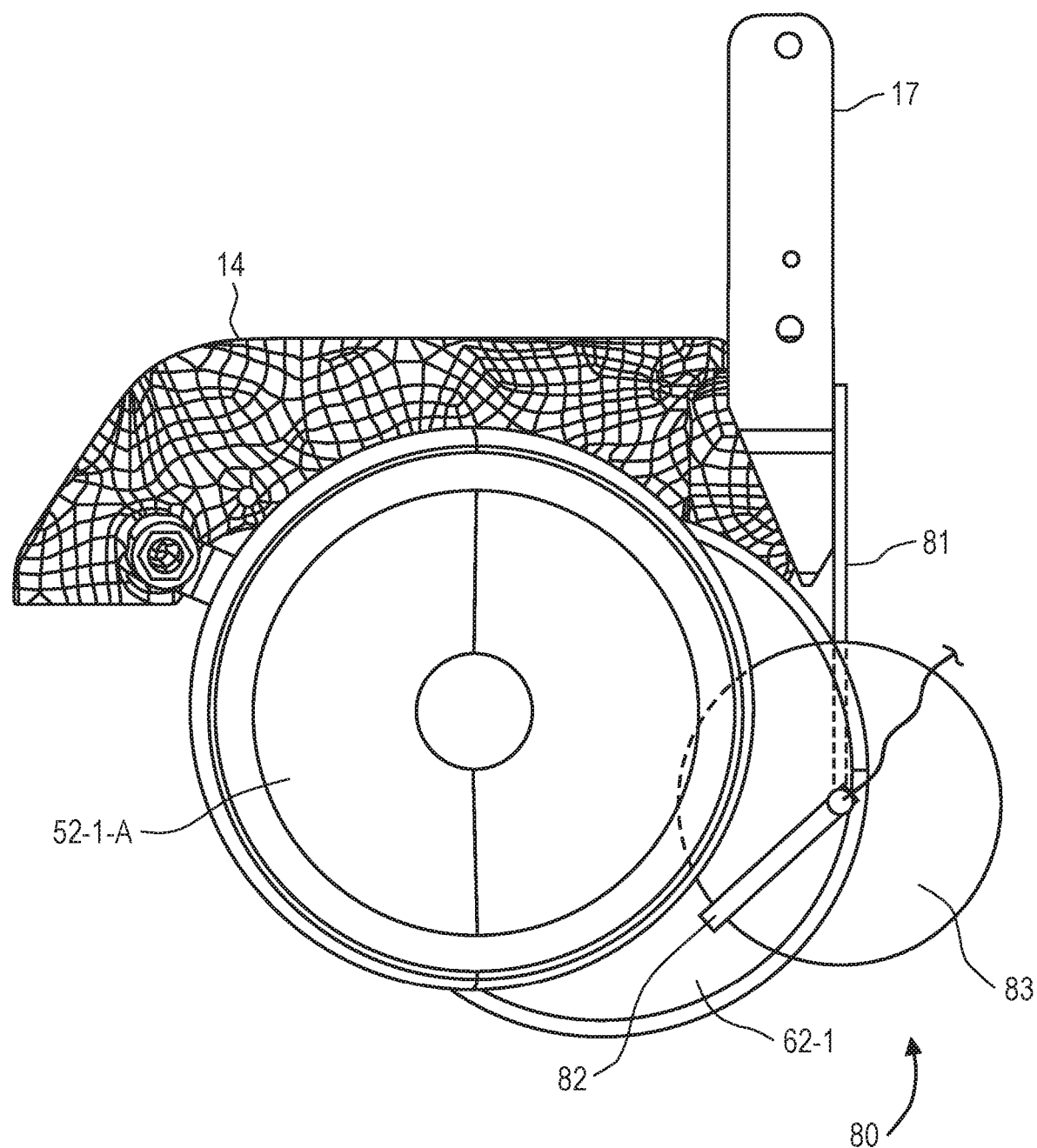
FIG. 24 is a side elevation view of a fluid injector, such as a coulter, according to one embodiment.

In another embodiment, knife 23 in any of the previous embodiments can be replaced with a fluid injector 80, such as a coulter 83. FIG. 24 illustrates a coulter 83 connected with bracket 81 to shank bracket 17. Coulter 83 is partially disposed between first wheel 52-1-A and second wheel 52-1-B. Fluid delivery tube 82 is disposed relative to the coulter to deposit fluid in the trench opened by coulter 83.

Fluid injector 80, such as knife 23 or coulter 83, can be disposed ahead of wheel 52 or behind wheel 52 and partially disposed in channel 110 or 110'. Also, fluid injector 80 can be disposed between first wheel 52-1-A and wheel 52-1-B.

Figure 25:
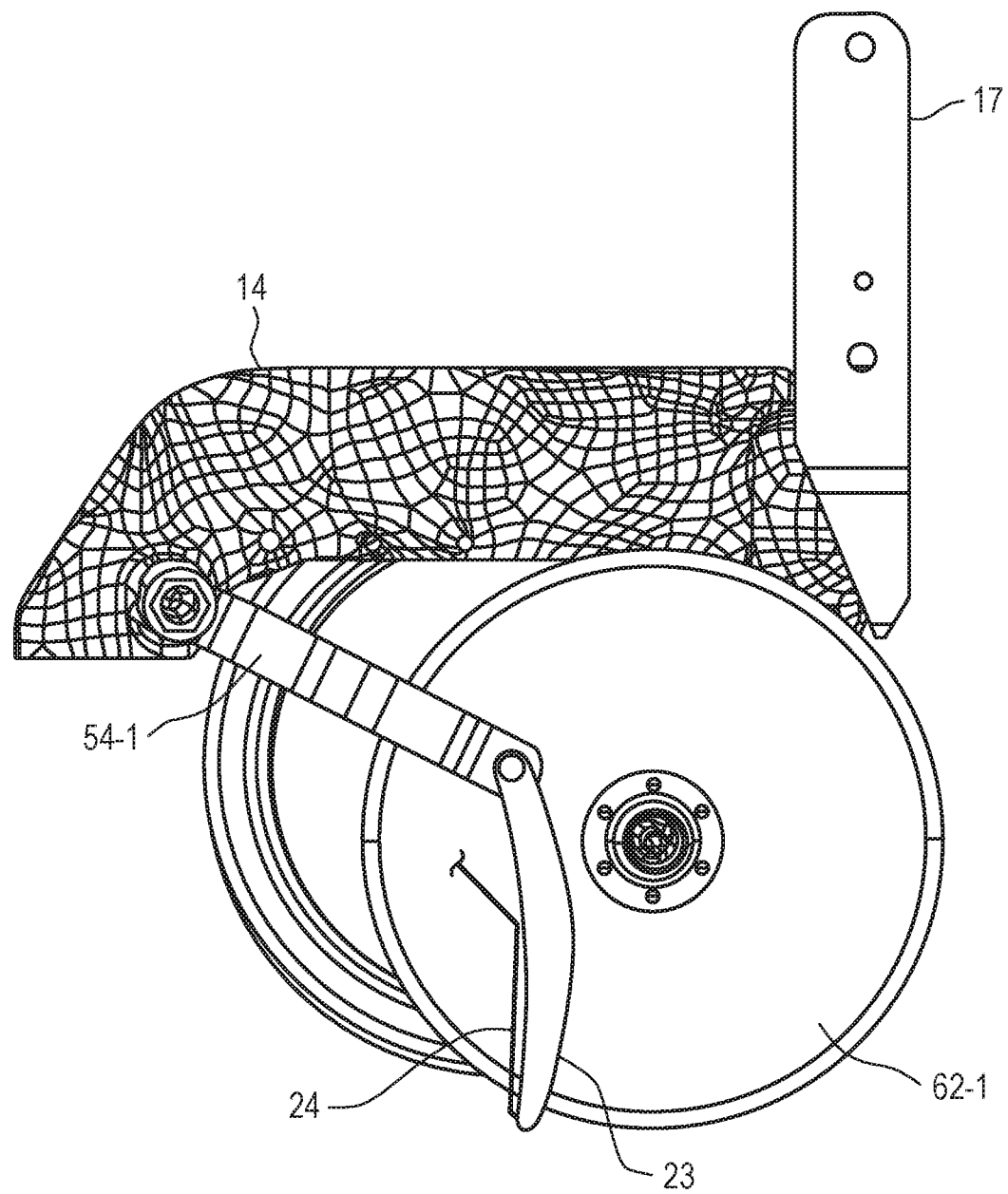
FIG. 25 is a side elevation view of a fluid injector, such as a knife, connected to a gauge wheel arm according to one embodiment.
Figure 26:
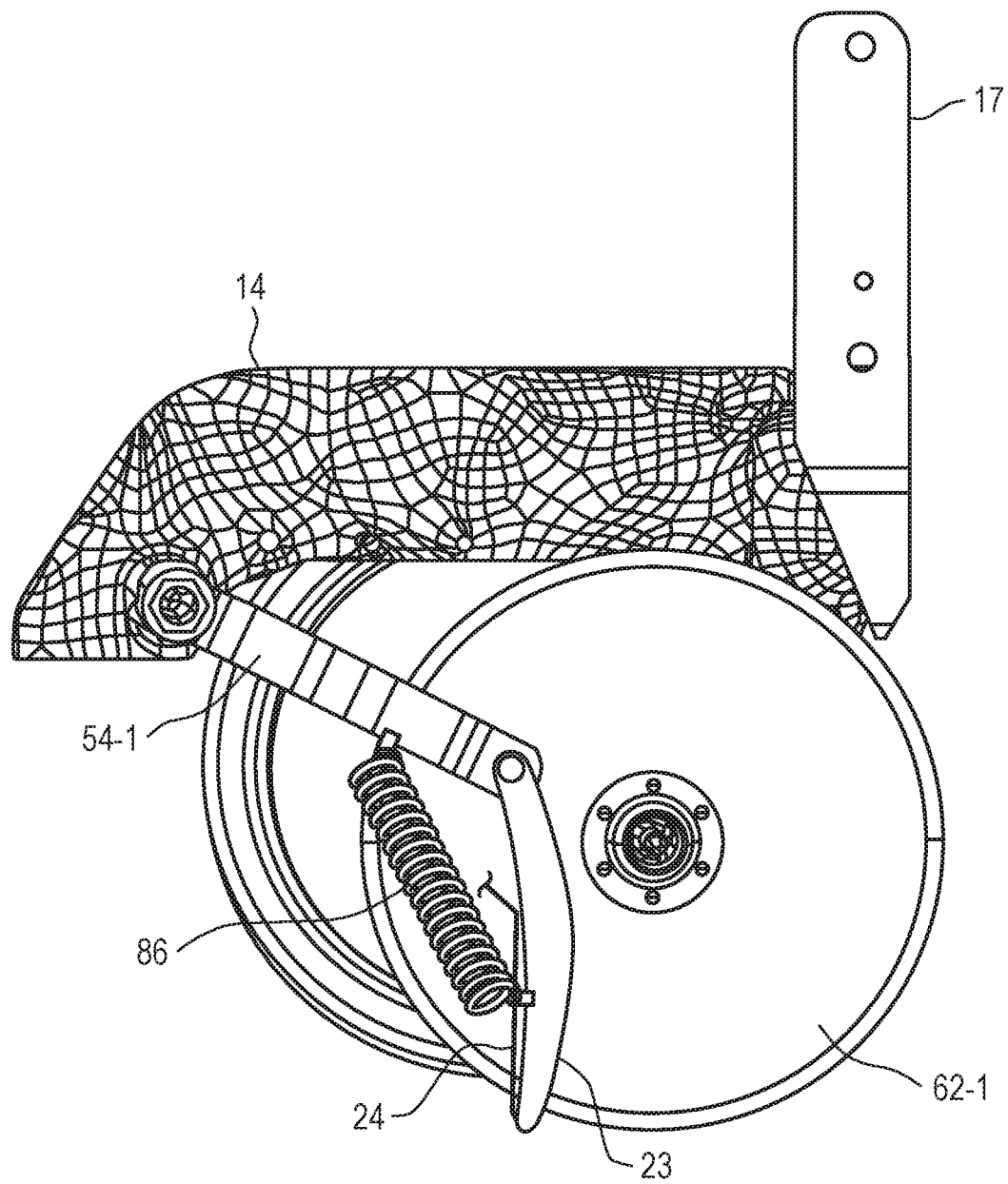
FIG. 26 is a side elevation view of a fluid injector, such as a knife, connected to a gauge wheel arm with a biasing member disposed between the gauge wheel arm and the fluid injector according to one embodiment.

In another embodiment, fluid injector 80, such as knife 23 can be connected to gauge wheel arm 54. FIG. 25 illustrates a rigid connection of knife 23 to gauge wheel arm 54-1. In another embodiment, the embodiment of FIG. 25 can be modified to have a biasing member 86, such as a spring, disposed between gauge wheel arm 53-1 and knife 23 to allow knife 23 to resiliently engage the ground as illustrated in FIG. 26.

In another embodiment illustrated in FIG. 27, fluid injector 80, such as knife 23 is connected to depth adjustment body 94 through pivot 89. As depth adjustment body 94 is moved, the depth of knife 23 is adjusted.

Figure 29A:
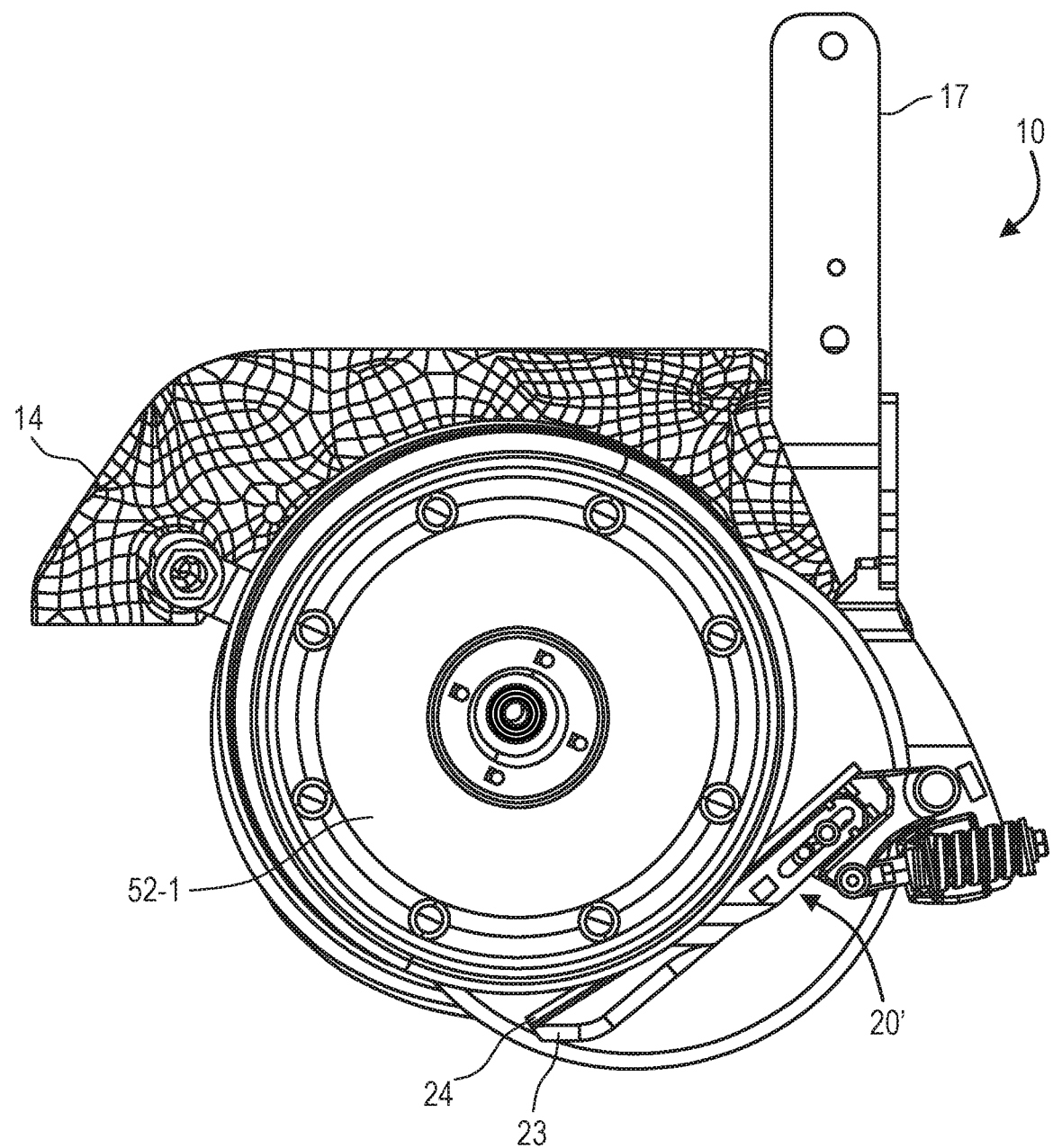
FIG. 29A illustrates a side view of a row unit in accordance with one embodiment.
Figure 29B:
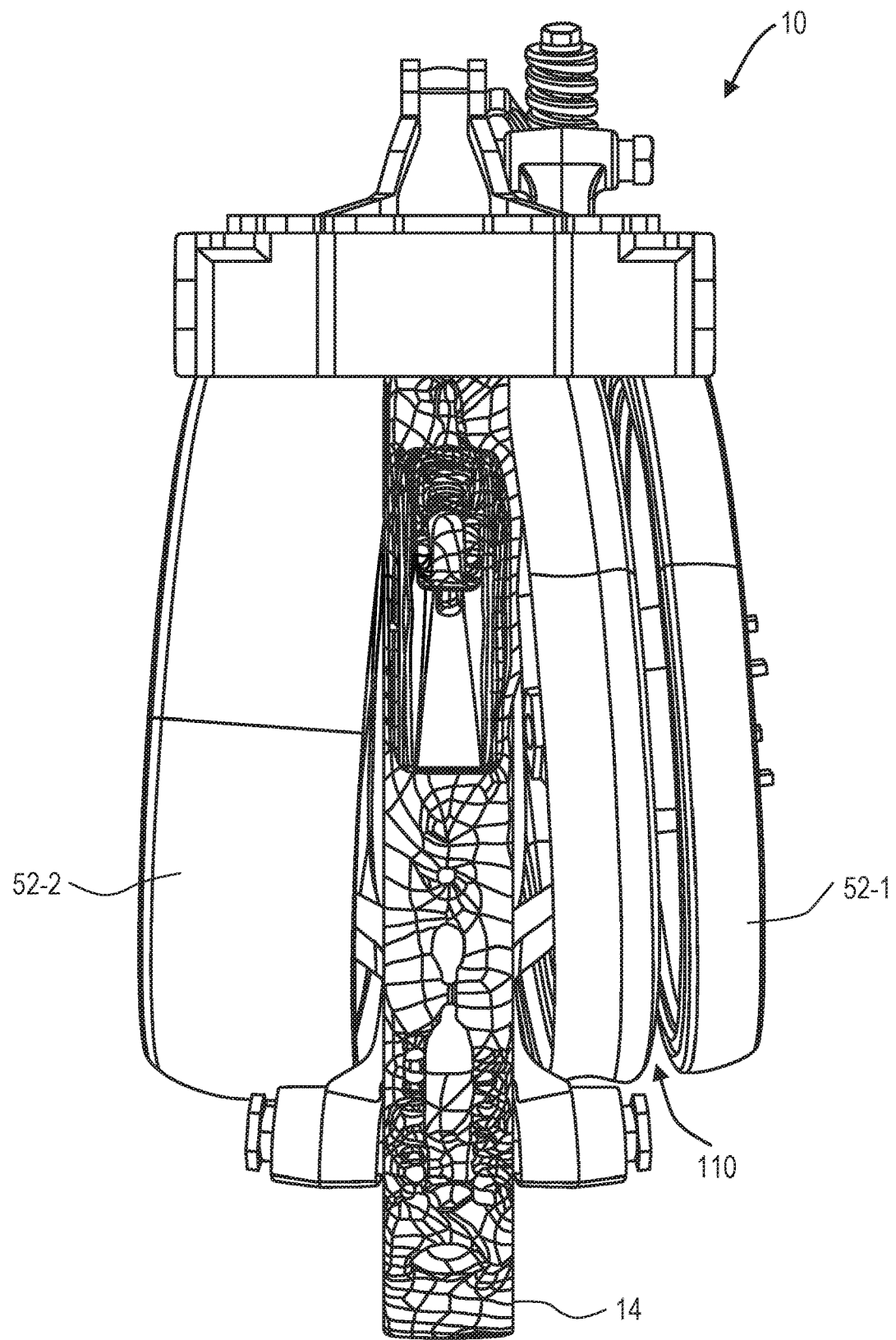
FIG. 29B illustrates a top view of the row unit in accordance with one embodiment.
Figure 29C:
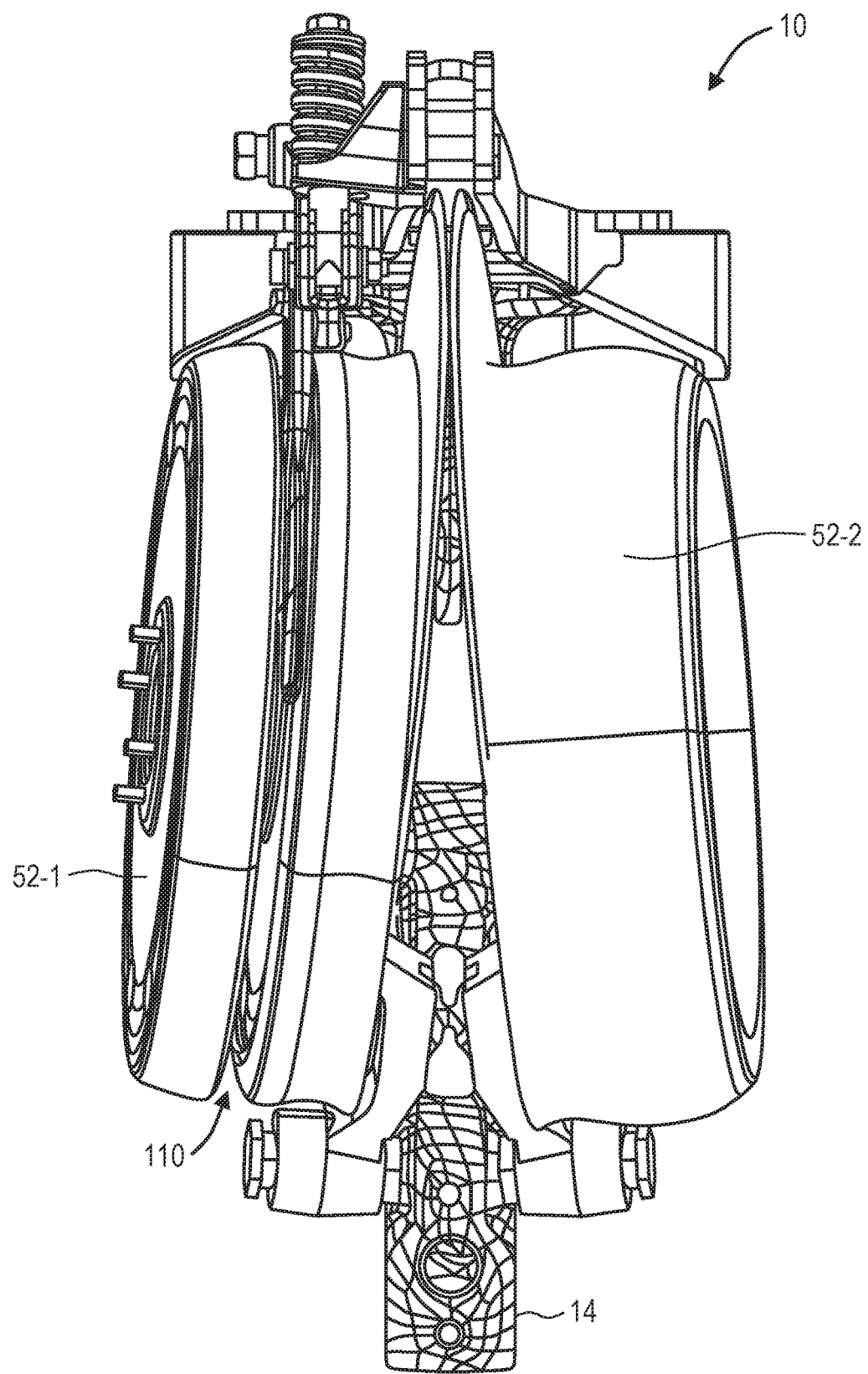
FIG. 29C illustrates a bottom view of the row unit in accordance with one embodiment.

Another embodiment of a row unit 10 (e.g., agricultural toolbar 10) is illustrated in FIGS. 29A to 29C. In this embodiment as illustrated in a side view of a row unit in FIG. 29A, the row unit 10 includes a frame 14, a shank bracket 17, gauge wheel 52-1, and a knife assembly 20' having knife 23. A delivery conduit 24 is disposed on knife 23.

FIG. 29B illustrates a top view of the row unit 10 in accordance with one embodiment. The row unit 10 includes a frame 14, gauge wheels 52-1, 52-2, and a channel 110 that separates two wheels placed next to each other and spaced apart to accept a knife 23 between them. In one embodiment illustrated in FIG. 22A, gauge wheel 52-1 includes first wheel 52-1-A and second wheel 52-1-B with the space between first wheel 52-1-A and second wheel 52-1-B forming the channel 110'. In this embodiment, gauge wheels 52-1-A and 52-1-B can be disposed on a common axle connected to gauge wheel arm 53-1 (not shown).

FIG. 29C illustrates a bottom view of the row unit 10 in accordance with one embodiment. The row unit 10 includes a frame 14, gauge wheels 52-1, 52-2, and a channel 110.

Figure 30A:
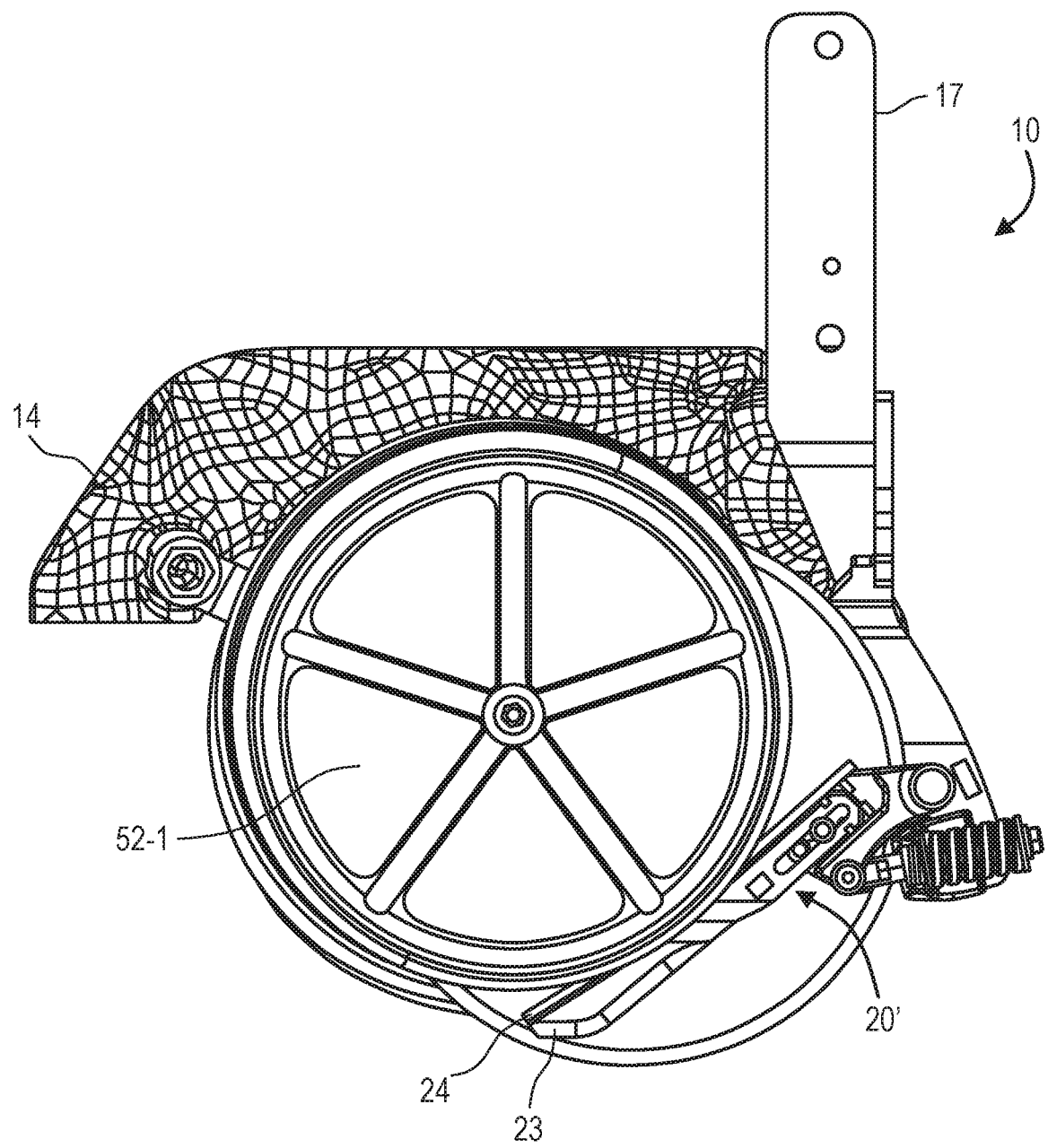
FIG. 30A illustrates a side view of a row unit in accordance with another embodiment.
Figure 30B:
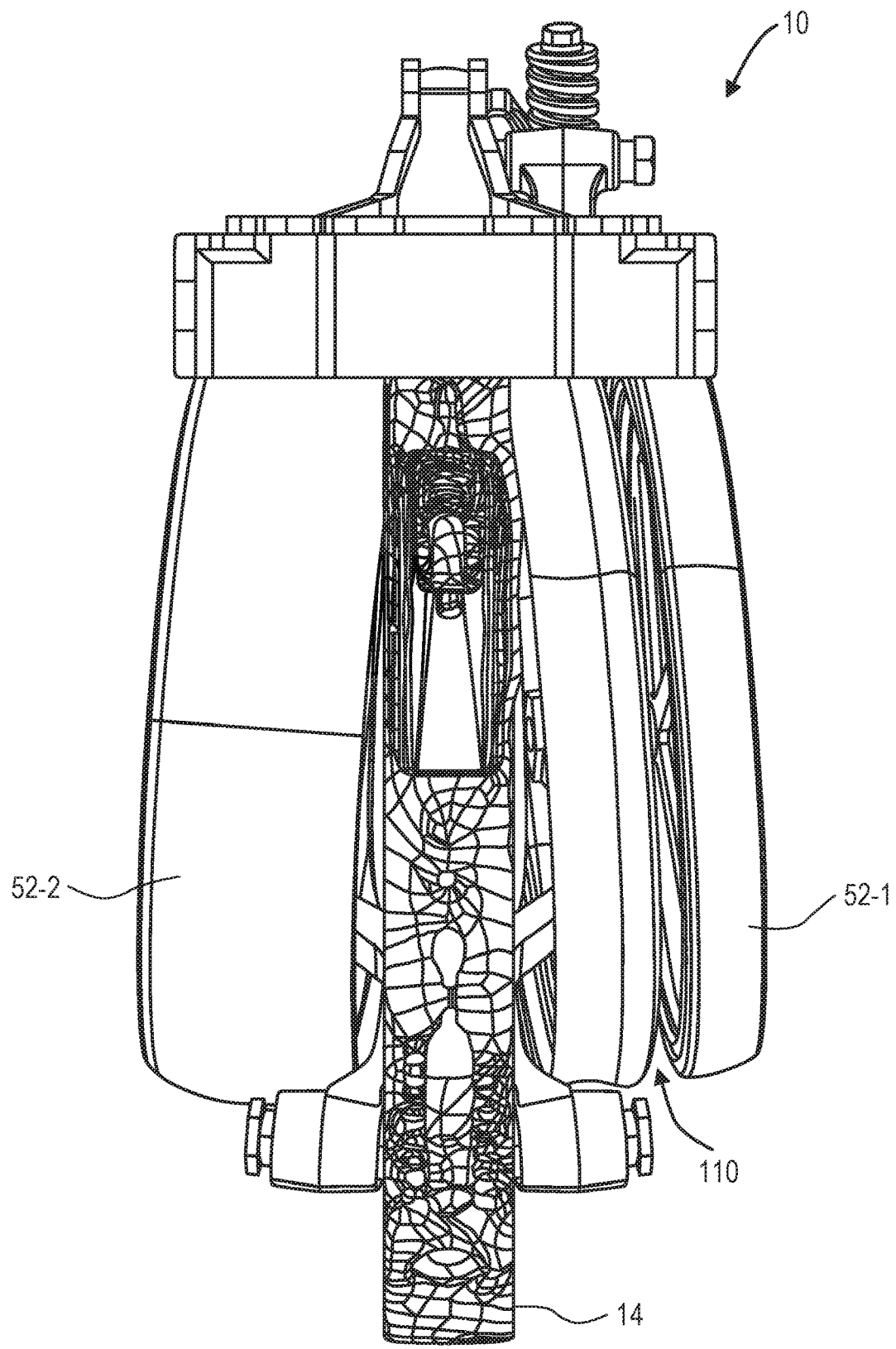
FIG. 30B illustrates a top view of the row unit in accordance with another embodiment.
Figure 30C:
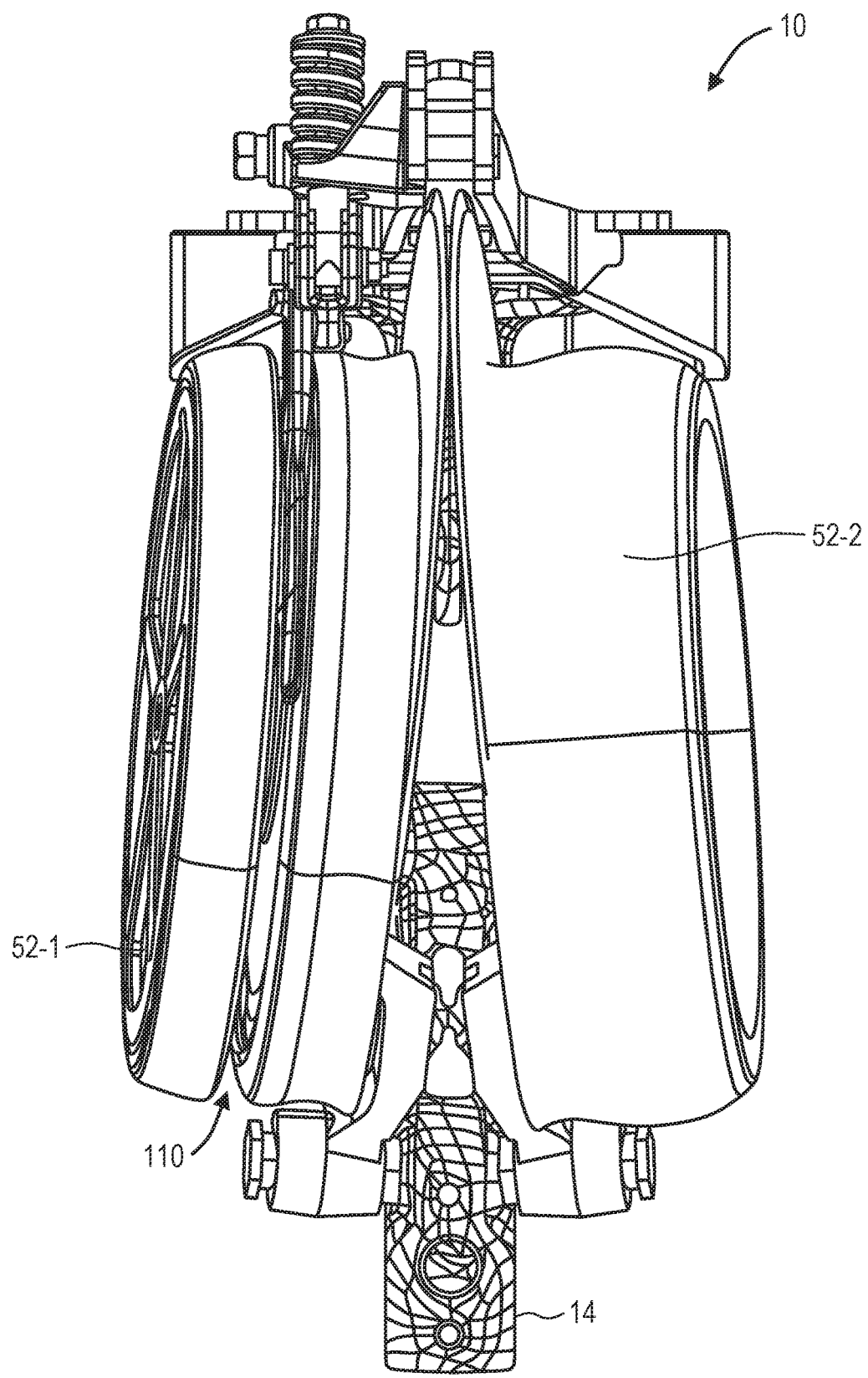
FIG. 30C illustrates a bottom view of the row unit in accordance with another embodiment.

Another embodiment of a row unit 10 (e.g., agricultural toolbar 10) is illustrated in FIGS. 30A to 30C. In this embodiment as illustrated in a side view of a row unit in FIG. 30A, the row unit 10 includes a frame 14, a shank bracket 17, gauge wheel 52-1 with at least one opening, and a knife assembly 20' having knife 23. A delivery conduit 24 is disposed on knife 23. In one example, the gauge wheel 52-1 has a hub and multiple spokes that form multiple openings to allow soil or mud from a field to escape or be forced out.

FIG. 30B illustrates a top view of the row unit 10 in accordance with one embodiment. The row unit 10 includes a frame 14, gauge wheels 52-1, 52-2, and a channel 110 that separates two wheels placed next to each other and spaced apart to accept a knife 23 between them. In one embodiment illustrated in FIG. 22A, gauge wheel 52-1 includes first wheel 52-1-A and second wheel 52-1-B with the space between first wheel 52-1-A and second wheel 52-1-B forming the channel 110'. In this embodiment, gauge wheels 52-1-A and 52-1-B can be disposed on a common axle connected to gauge wheel arm 53-1 (not shown). The outer wheel 52-1 with a hub and multiple spokes is designed to allow soil or mud from a field to escape or be forced out of the channel and the wheel 52-1.

FIG. 30C illustrates a bottom view of the row unit 10 in accordance with one embodiment. The row unit 10 includes a frame 14, gauge wheels 52-1, 52-2, and a channel 110.

While the above embodiments illustrate the knife 23 with gauge wheels 52 or closing wheels 41, the knife 23 can be used with any wheel on an agricultural toolbar. Examples of agricultural toolbars include, but are not limited to, row units, air seeders, air drills, side dress bars, tillage toolbars, and fertilizer toolbars.

Figure 31:
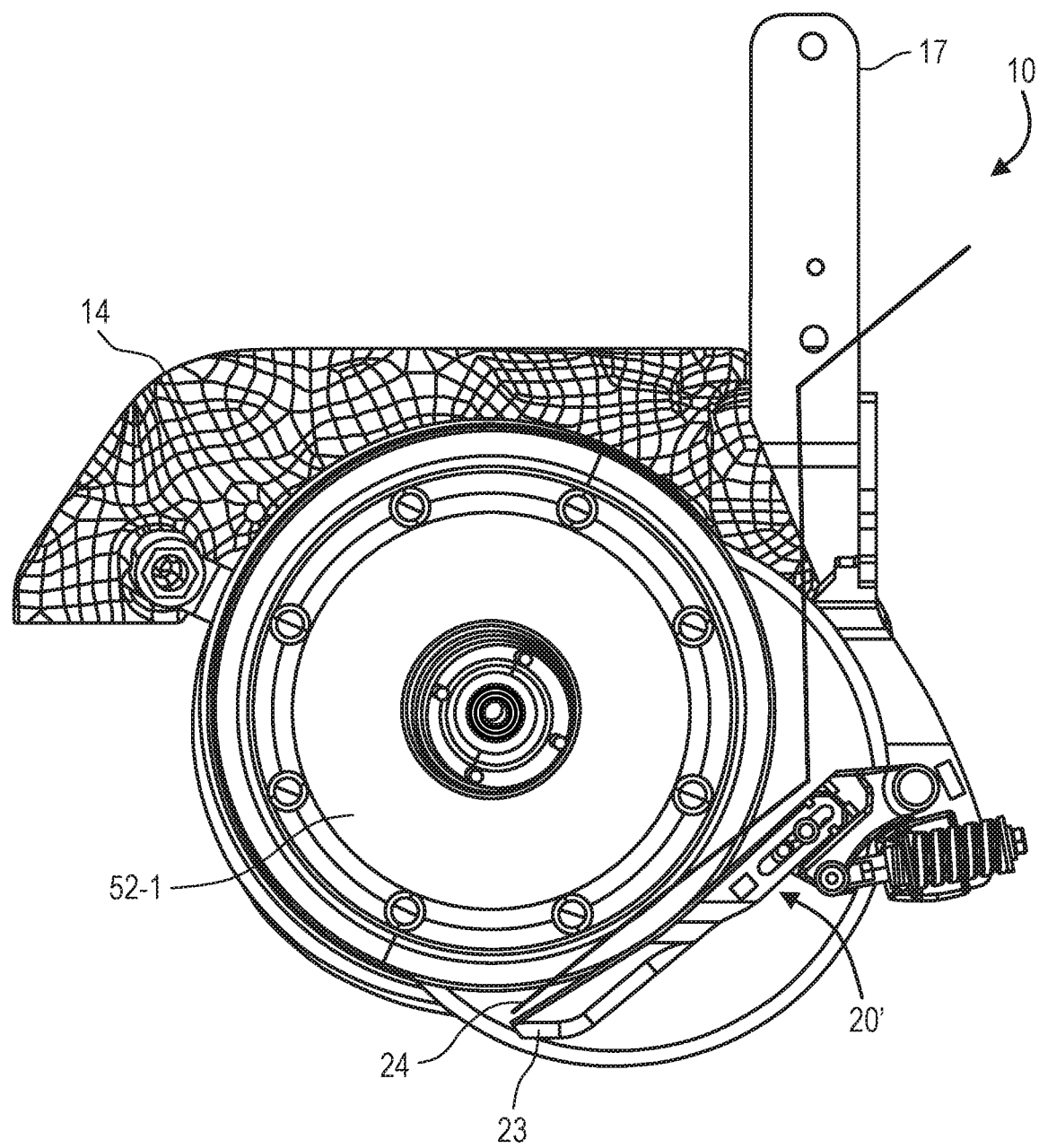
FIG. 31 illustrates a side view of a row unit in accordance with another embodiment.

While illustrated with conduit 24 connected to knife 23, conduit 24 does not need to be connected to knife 23. Conduit 24 can be disposed adjacent to knife 23. In one embodiment, conduit 24 can be connected to frame 14 either directly or through another part connected to frame 14. An example of this embodiment is illustrated in FIG. 31.

Figure 32A:
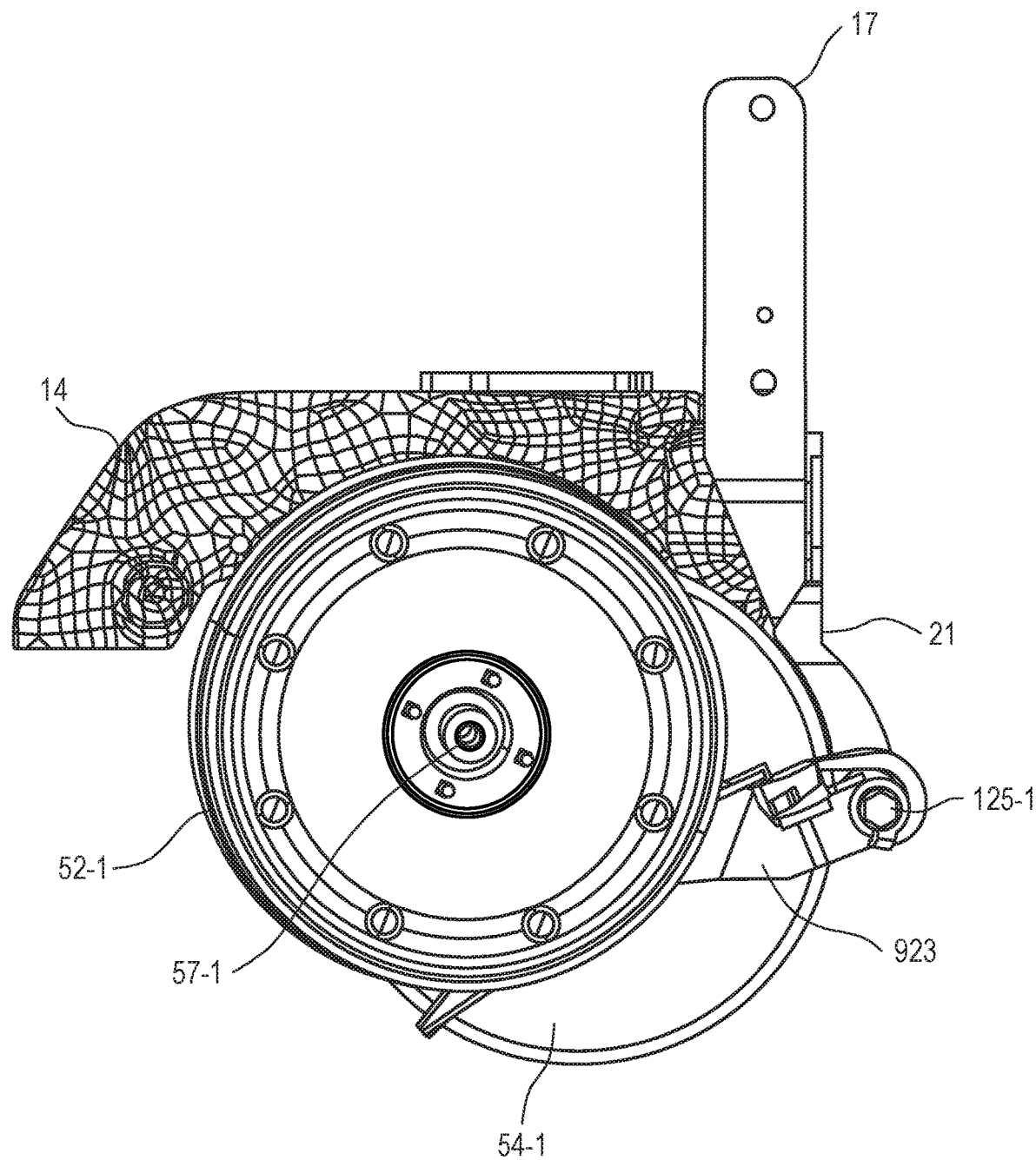
FIG. 32A illustrates a side view of a row unit in accordance with another embodiment.
Figure 32B:
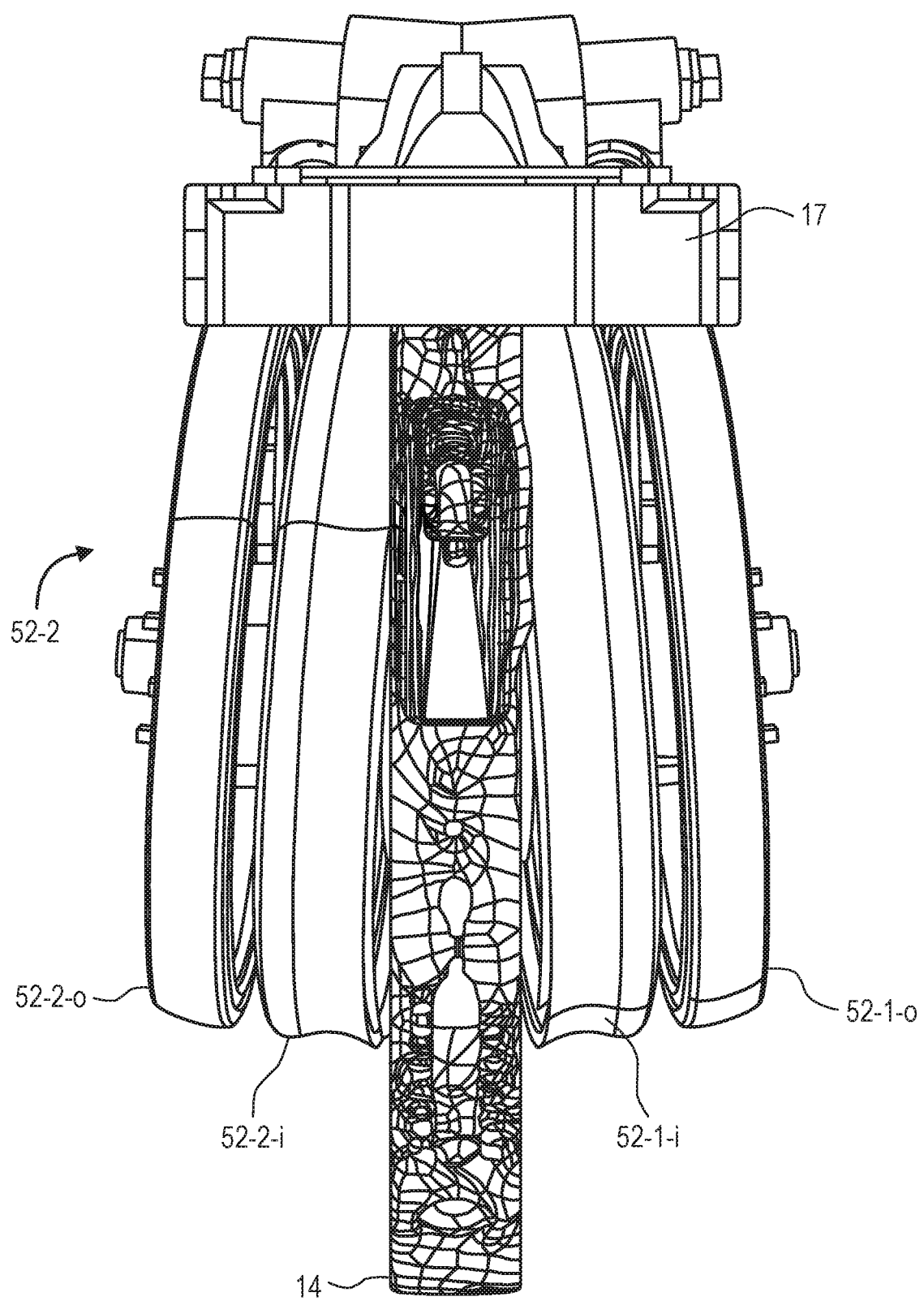
FIG. 32B illustrates a top view of the row unit of FIG. 32A.
Figure 32C:
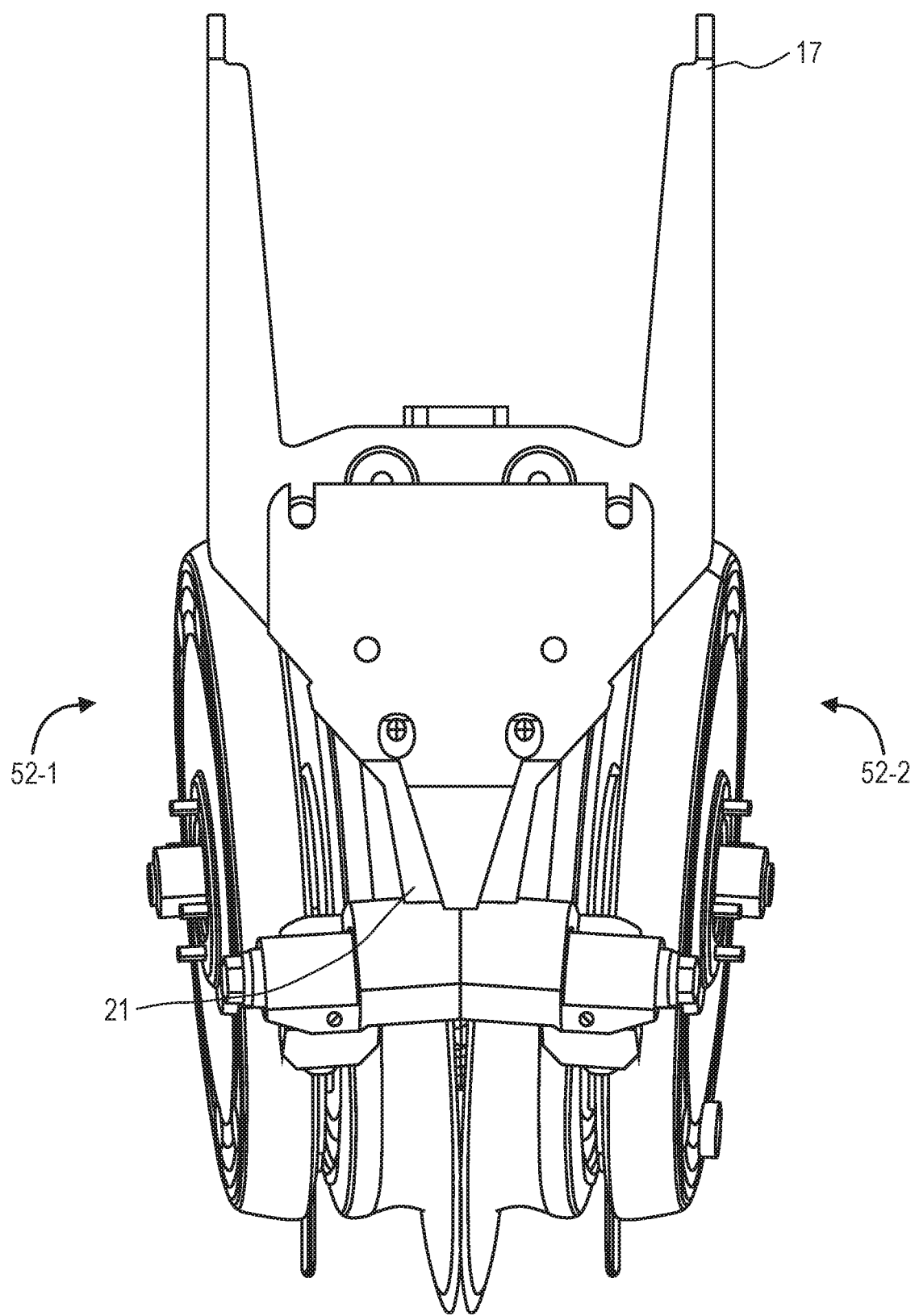
FIG. 32C illustrates a front view of the row unit of FIG. 32A.
Figure 32D:
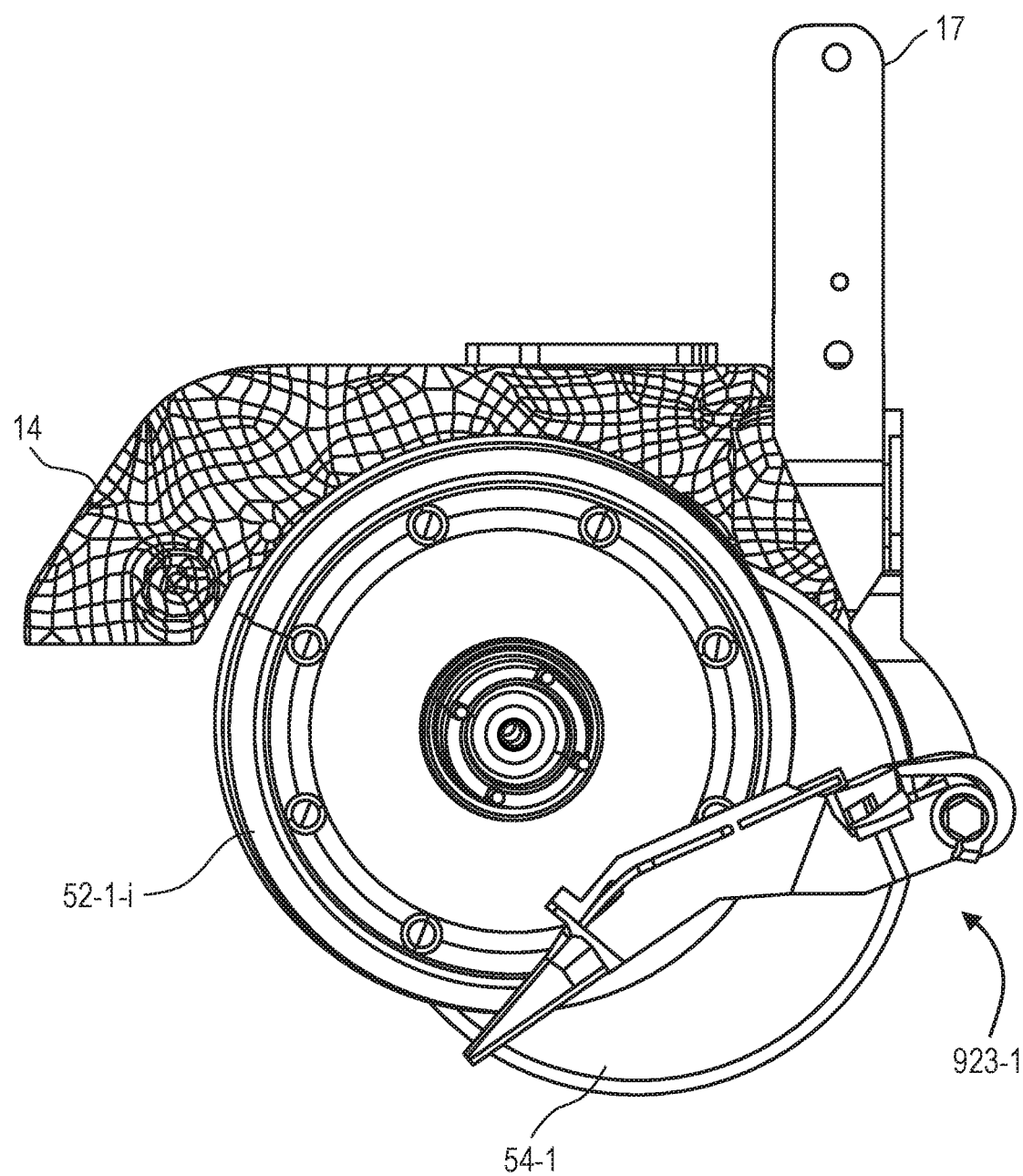
FIG. 32D illustrates a side view of the row unit of FIG. 32A with the outer gauge wheel removed.
Figure 32E:
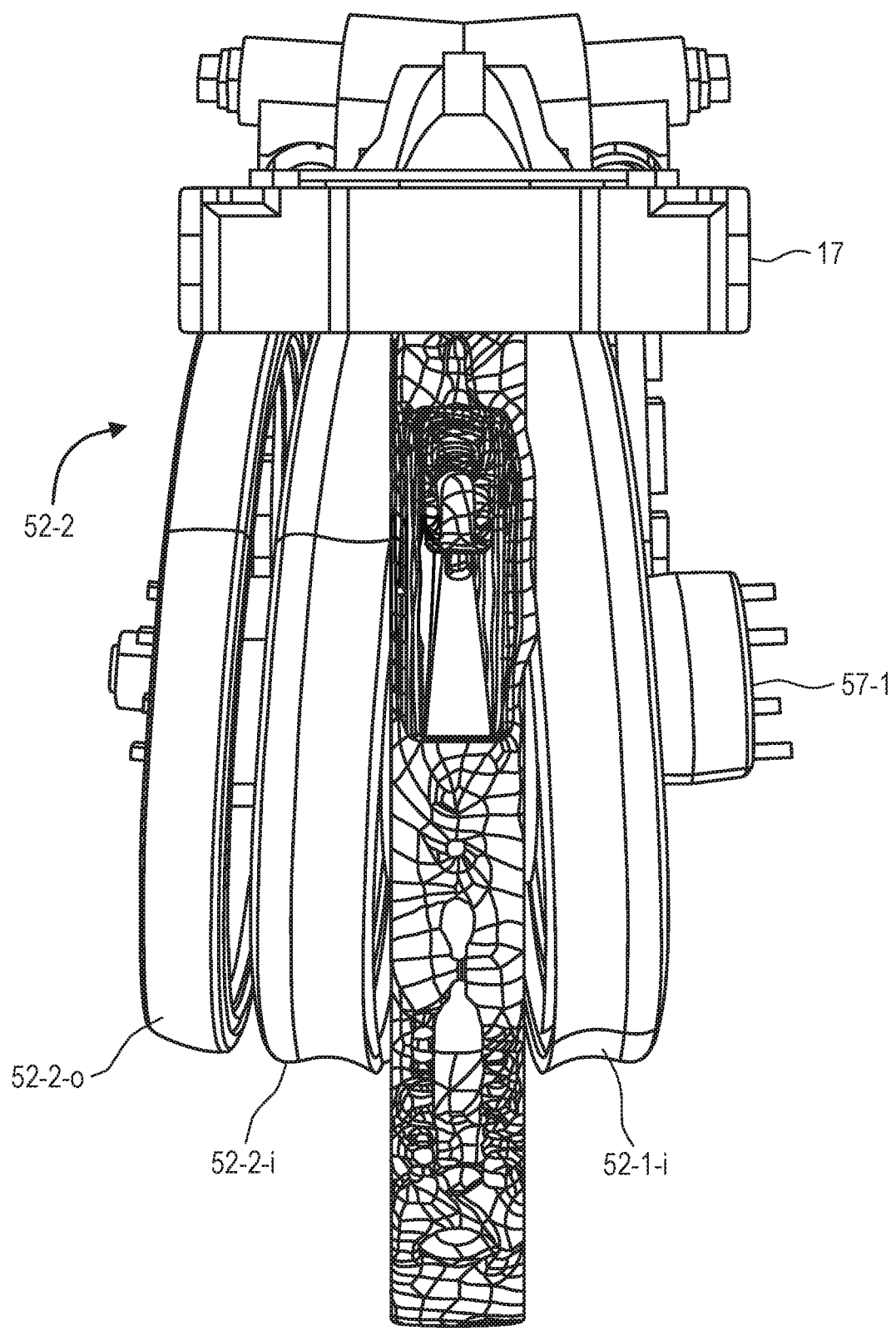
FIG. 32E illustrates a top view of the row unit of FIG. 32D.
Figure 32F:
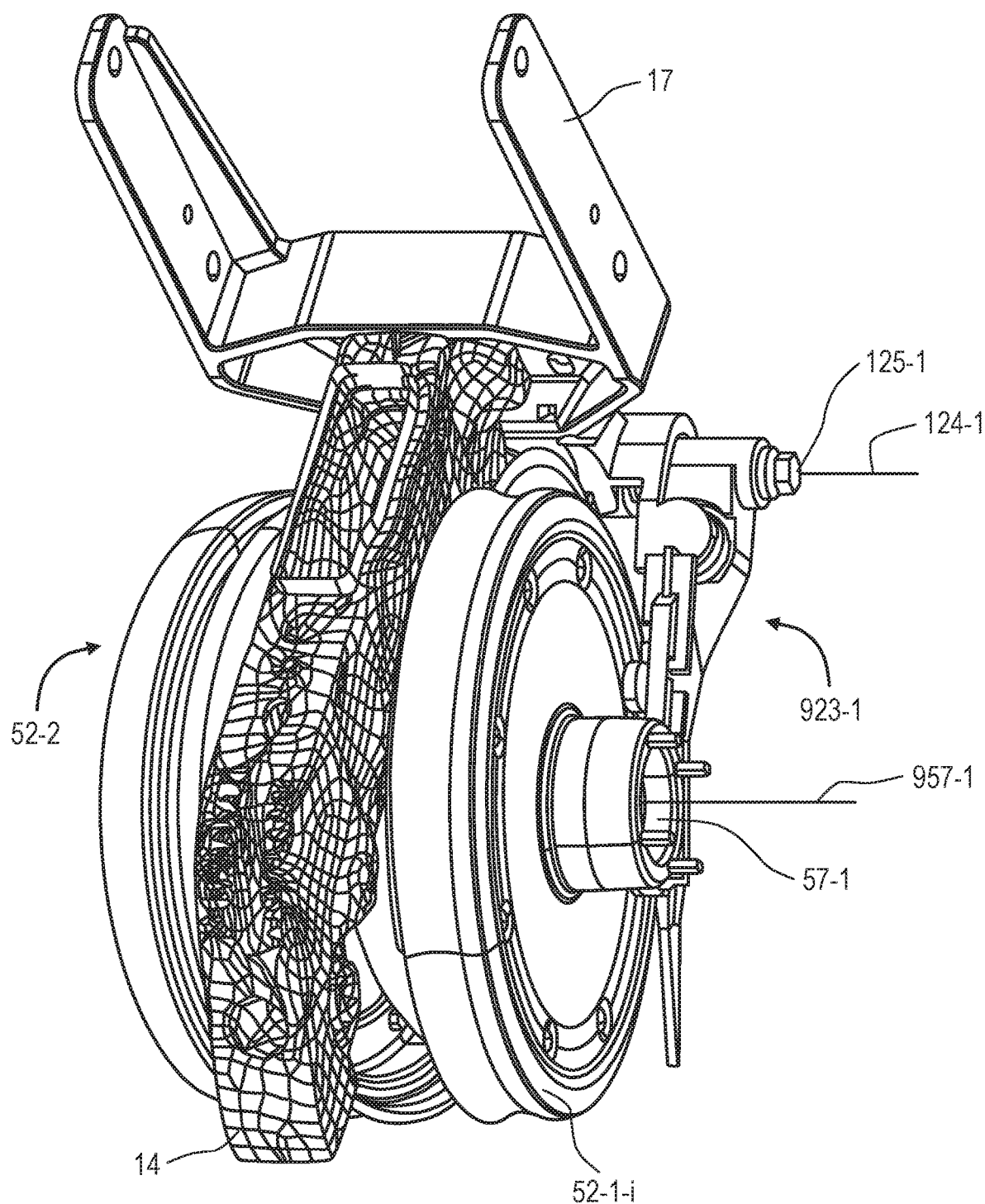
FIG. 32F illustrates a perspective view of the row unit of FIG. 32D.
Figure 32G:
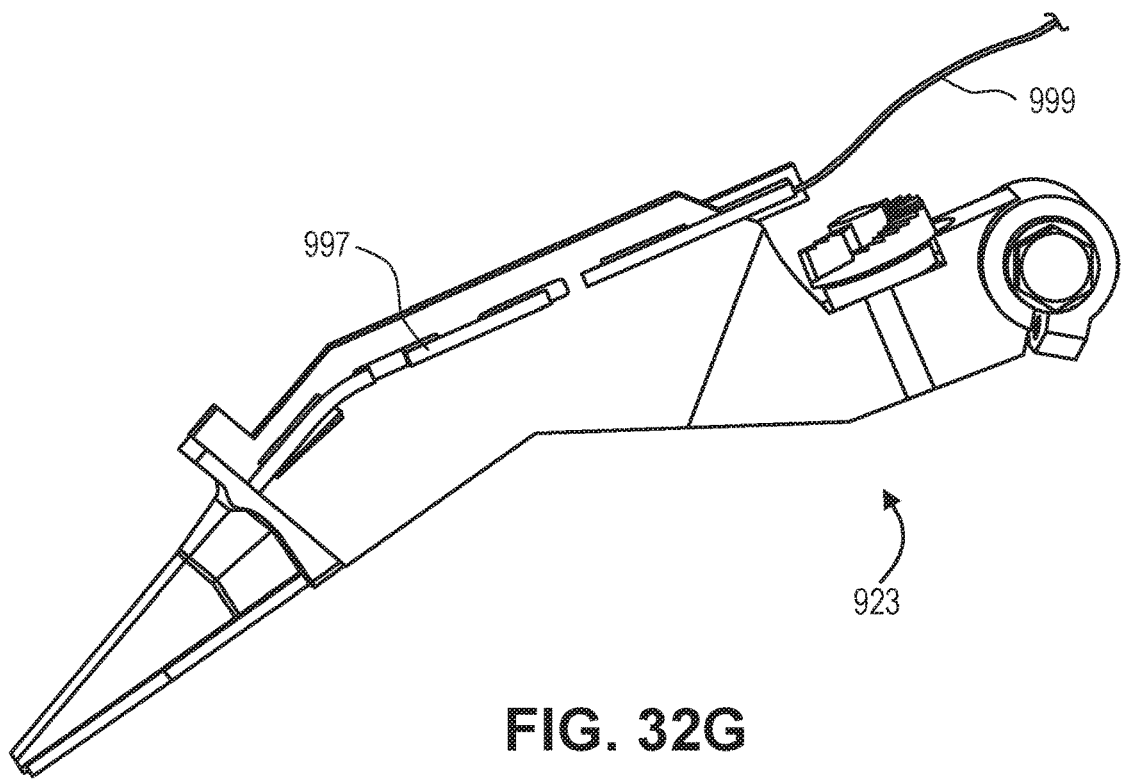
FIG. 32G illustrates a side view the knife from FIG. 32A.
Figure 32H:
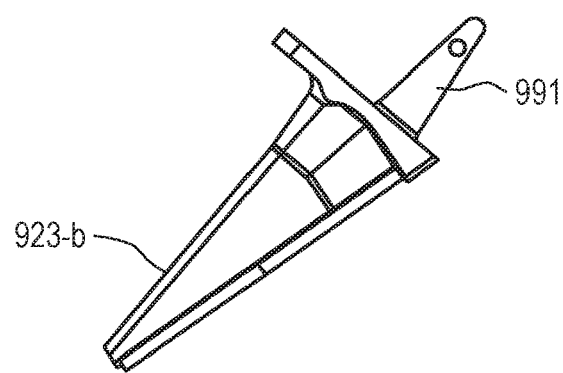
FIG. 32H illustrates a side view of a lower portion of the knife of FIG. 32G.
Figure 32I:
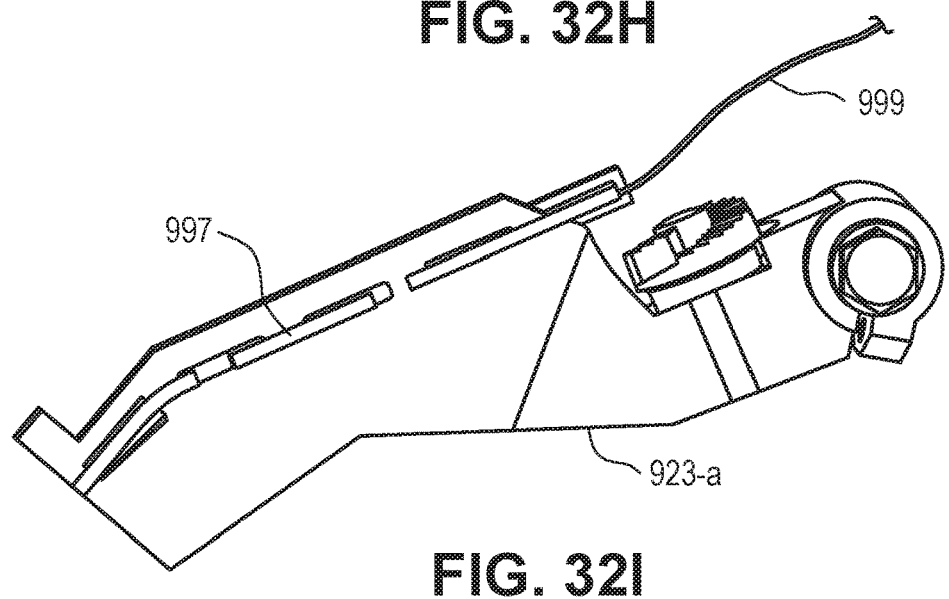
FIG. 32I illustrates a side view of an upper portion of the knife of FIG. 32G.
Figure 32J:
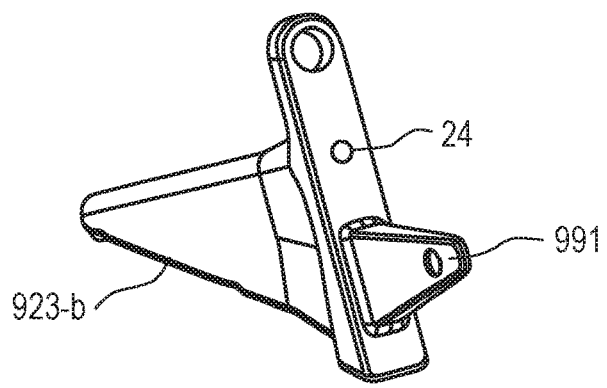
FIG. 32J is a perspective view of the lower portion of the knife of FIG. 32H.
Figure 32K:
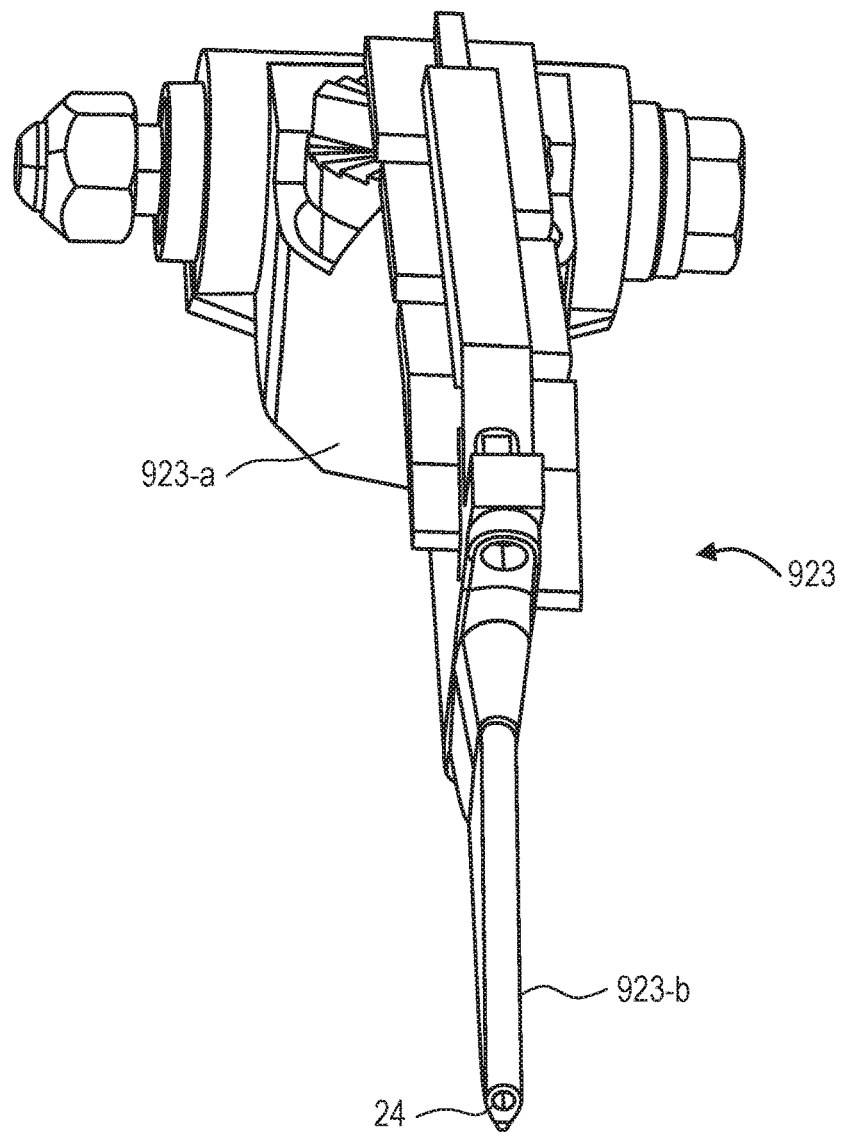
FIG. 32K is a perspective view of the knife of FIG. 32G.

FIGS. 32A to 32K illustrate another embodiment of a row unit. In this embodiment, gauge wheel 52 (52-1, 52-2) is made in two parts. An inner gauge wheel (52-1-i, 52-2-i) and an outer gauge wheel (52-1-o, 52-2-o) form gauge wheel 52-1 and 52-2, respectively to have a space for accepting knife 923 (923-1, 923-2). Knife 923 is disposed on knife bracket 21 through pivot 125. An pivot axis 124 runs through pivot 125 about which knife 923 (923-1, 923-2) pivots. Like the previous embodiment, pivot axis 124 is parallel or approximately parallel (within 10 degrees, within 5 degrees, or within 2 degrees) to the axis 957 (957-1, 957-2) about which gauge wheel axle 57 (57-1, 57-2) rotates. FIGS. 32D to 32F have the outer gauge wheel 52-1-o removed for viewing other parts. While illustrated with both gauge wheels 52-1 and 52-2 having the knife 923, one of the knives 923 does not need to be present.

Knife 923 is illustrated in FIGS. 32G to 32K. In this embodiment, knife 923 is made from two parts, upper knife portion 923-a and lower knife portion 923-b. Lower knife portion 923-b can optionally have a mating protrusion 991 for mating within upper knife portion 923-a. Fluid conduit 24 is disposed through lower knife portion 923-b. Material distribution tube 999 connects to fluid conduit 24. Optionally, material distribution tube 999 can be disposed in a channel 997 in the upper knife portion 923-a. Alternatively, knife 923 can be unitary construction as one part with fluid conduit 24 disposed through knife 923.

What is claimed is:

1. An agricultural toolbar comprising:
   a frame;
   a furrow opening assembly mounted to the frame for opening a trench in soil;
   a wheel mounted to the frame and disposed to roll along a surface of a ground; and
   a knife disposed ahead of the wheel and comprising a material delivery conduit disposed on, through, or adjacent the knife,
   wherein the wheel is disposed in proximity to the knife to pull away any crop residue that becomes entangled on the knife,
   wherein the knife is positioned laterally adjacent to the trench.

2. The agricultural toolbar of claim 1, wherein the wheel is a gauge wheel.

3. The agricultural toolbar of claim 1 further comprising a relief system disposed on the knife to allow the knife to flex.

4. The agricultural toolbar of claim 3, wherein the relief system allows for movement of the knife away from the direction of travel of the toolbar.

5. The agricultural toolbar of claim 3, wherein the relief system allows for transverse movement of the knife to the direction of travel of the toolbar.

6. The agricultural toolbar of claim 1, wherein the wheel has at least one protrusion disposed about the circumference of the wheel and extending radially.

7. The agricultural toolbar of claim 1, wherein the wheel has a channel disposed from the outer circumference and radially inward toward the center of the wheel and disposed to at least partially accept the knife within the channel.

8. The agricultural toolbar of claim 7, wherein the wheel comprises a pair of wheels spaced apart to form the channel to at least partially accept the knife within the channel.

9. The agricultural toolbar of claim 8, wherein at least one of wheels is a finger wheel.

10. The agricultural toolbar of claim 1 further comprising a coulter disposed ahead of the knife.

11. The agricultural toolbar of claim 1 further comprising:
an additional wheel mounted to the frame; and
an additional knife disposed ahead of the additional wheel and comprising an additional material delivery conduit disposed on, through, or adjacent the additional knife.

12. An agricultural toolbar comprising:
a frame;
a furrow opening assembly mounted to the frame for opening a trench in soil;
a wheel mounted to the frame and disposed to roll along a ground; and
a knife disposed laterally adjacent to the wheel and comprising a material delivery conduit disposed on, through, or adjacent the knife such that a lateral distance between the knife and the wheel permits the wheel to pull debris away from the knife,
wherein the knife is positioned laterally adjacent to the trench.

13. The agricultural toolbar of claim 12, wherein the lateral distance between the knife and the wheel is approximately 1 to 100 millimeters (mm).

14. An agricultural toolbar comprising:
a frame;
a furrow opening assembly for opening a trench in soil;
a wheel mounted to the frame and disposed to be on one side of the trench opened by the furrow opening assembly, wherein the wheel has a channel disposed from the outer circumference and radially inward toward the center of the wheel and disposed to at least partially accept a fluid injector at least partially within the channel, wherein the fluid injector is disposed to dispense fluid a lateral distance from the trench created by the furrow opening assembly.

15. The agricultural toolbar of claim 14, wherein the fluid injector comprises a knife having a material delivery conduit disposed on the knife.

16. The agricultural toolbar of claim 14, wherein the channel is disposed to approximately fully accept the knife within the channel to reduce debris build up around the knife.

17. The agricultural toolbar of claim 14, wherein the fluid injector is a coulter and fluid delivery tube.

18. The agricultural toolbar of claim 14, wherein the wheel comprises a pair of wheels spaced apart to form the channel to at least partially accept the fluid injector within the channel.

19. The agricultural toolbar of claim 14, wherein the fluid injector is disposed ahead of the wheel.

20. The agricultural toolbar of claim 18, wherein the fluid injector is disposed between the pair of wheels.

21. The agricultural toolbar of claim 18, wherein at least one of the pair of wheels is a finger wheel.

22. The agricultural toolbar of claim 18, wherein the pair of wheels are disposed on a common axle connected to a wheel arm.

23. The agricultural toolbar of claim 22, wherein an outer wheel of the pair of wheels includes a hub and multiple spokes to allow soil or mud from a field to escape or be forced out of the channel and the outer wheel.

24. The agricultural toolbar of claim 14, further comprising:
a scraper positioned with a distal end of the scraper to be disposed in the channel to remove any debris that accumulates in channel.

25. The agricultural toolbar of claim 14, wherein the wheel has at least one protrusion disposed about the circumference of the wheel and extending radially.

* * * * *